(12) United States Patent
Otake

(10) Patent No.: US 7,369,313 B2
(45) Date of Patent: May 6, 2008

(54) ZOOM LENS AND IMAGE PICKUP APPARATUS

(75) Inventor: Motoyuki Otake, Saitama (JP)

(73) Assignee: Sony Corporation (JP)

( * ) Notice: Subject to any disclaimer, the term of this patent is extended or adjusted under 35 U.S.C. 154(b) by 152 days.

(21) Appl. No.: 11/436,557

(22) Filed: May 19, 2006

(65) Prior Publication Data
US 2007/0014032 A1 Jan. 18, 2007

(30) Foreign Application Priority Data
May 26, 2005 (JP) ............................ P2005-153624

(51) Int. Cl.
*G02B 27/64* (2006.01)
(52) U.S. Cl. ...................... 359/557; 359/554; 359/813; 348/208.11; 396/55; 396/73
(58) Field of Classification Search ................ 359/554, 359/557, 813; 348/208, 208.4, 208.11; 396/55, 396/73
See application file for complete search history.

(56) References Cited

U.S. PATENT DOCUMENTS

| 6,587,271 | B2 * | 7/2003 | Shinohara | ................... 359/557 |
| 2003/0053210 | A1 | 3/2003 | Shinohara | |

FOREIGN PATENT DOCUMENTS

| JP | 2000-121938 | 4/2000 |
| JP | 2002-244037 | 8/2002 |
| JP | 2003-226001 | 8/2003 |
| JP | 2003-295057 | 10/2003 |

OTHER PUBLICATIONS

European Search Report, Application No./Patent No.; 06114529.8-2217; dated Oct. 16, 2006.

* cited by examiner

*Primary Examiner*—Hung Dang
*Assistant Examiner*—Joseph Martinez
(74) *Attorney, Agent, or Firm*—Rader Fishman & Grauer PLLC; Ronald P. Kananen

(57) ABSTRACT

A zoom lens wherein the image plane movement upon lens shifting is minimized. A power variation section and a final lens group are disposed in order from an object side. The power variation section includes at least two lens groups movable in an optical axis direction to vary a lens position state. The final lens group is fixed in the optical axis direction and includes first to third sub groups having negative, positive and positive refracting powers and disposed in order from the object side. The second sub group is shiftable substantially perpendicularly to the optical axis to shift an image. A conditional expression 0.2<ft/fBt<0.8 is satisfied where ft and fBt are the focal distances of the lens system and entire lens groups disposed on the object side of the third sub group in the telephoto end state.

10 Claims, 20 Drawing Sheets

LATERAL ABERRATION

LATERAL ABERRATION

F I G. 1 1
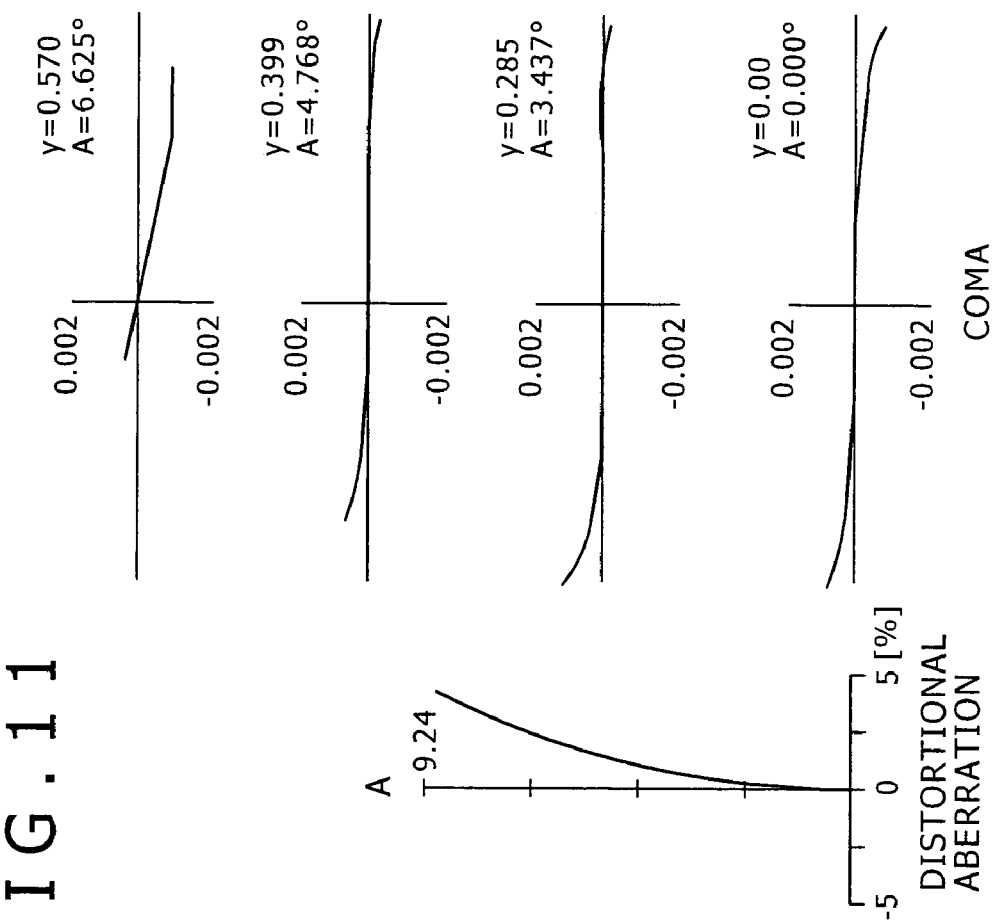

LATERAL ABERRATION

LATERAL ABERRATION

LATERAL ABERRATION

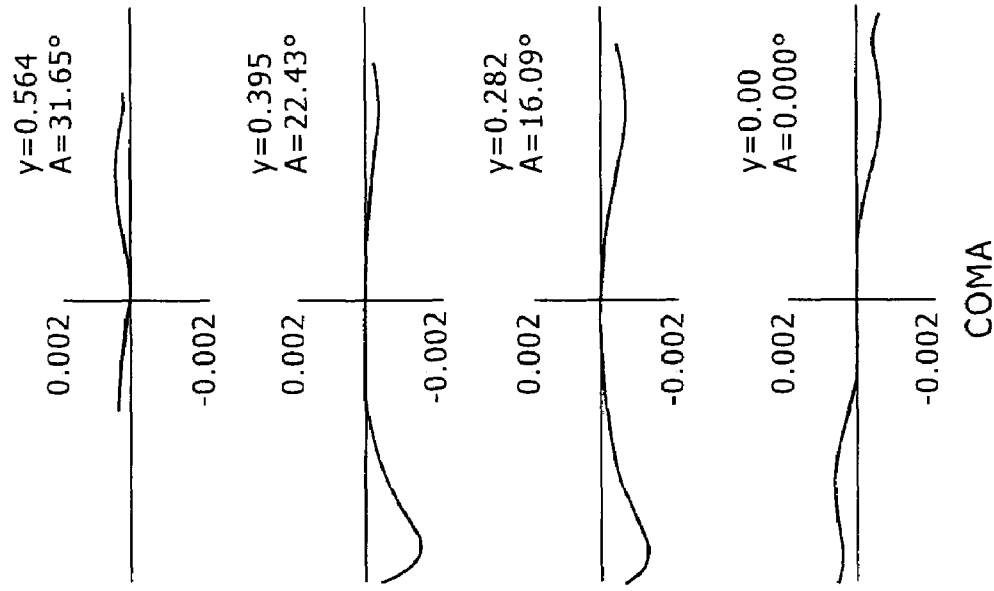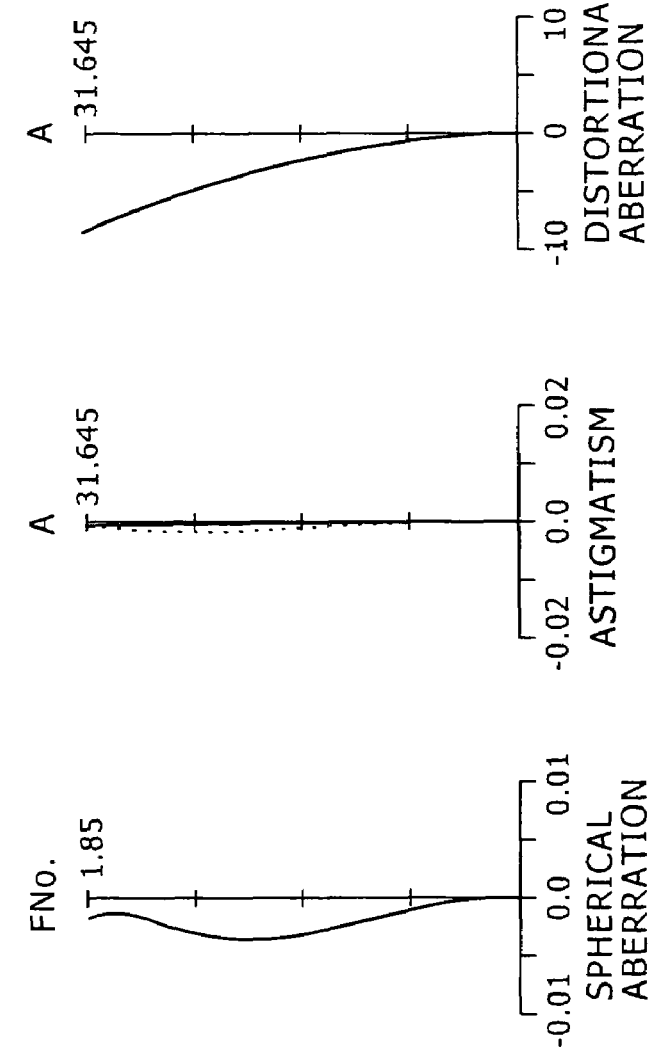
FIG.16

LATERAL ABERRATION

LATERAL ABERRATION

ZOOM LENS AND IMAGE PICKUP APPARATUS

CROSS REFERENCES TO RELATED APPLICATIONS

The present invention contains subject matter related to Japanese Patent Application JP 2005-153624 filed with the Japanese Patent Office on May 26, 2005, the entire contents of which being incorporated herein by reference.

BACKGROUND OF THE INVENTION

This invention relates to a novel zoom lens and image pickup apparatus, and more particularly to a zoom lens and an image pickup apparatus suitable for use with a camera such as a video camera or a digital still camera wherein an image pickup device is used to receive light to pick up an image.

Zoom lenses of various zoom types have been, in the past, used for video cameras.

One of such zoom lenses as mentioned above is disclosed, for example, in Japanese Patent Laid-open No. 2000-121938 (hereinafter referred to as Patent Document 1). The zoom lens disclosed in Patent document 1 adopts a five-group configuration having positive, negative, positive, positive and negative lens groups. In particular, the zoom lens includes a first lens group having a positive refracting power, a second lens set having a negative refracting power, a third lens group having a positive refracting power, a fourth lens group having a positive refracting power, and a fifth lens group having a negative refracting power, disposed in order from the object side.

In an optical system having a high zoom ratio, the angle of view in a telephoto end state is narrow, and therefore, a large blur occurs with an image even by a small hand shake. Therefore, a video camera particularly having a high zoom ratio incorporates an electronic hand shake correction system wherein an image fetching range of a light receiving device is shifted so as to correct a hand shake.

Further, a hand shake correction optical system has been, in the past, known wherein some lens group which is a component of a lens system is shifted in a direction substantially perpendicular to the optical axis of the lens system to compensate for deterioration of the optical performance which occurs when an image position is shifted.

The hand shake correction optical system can function as an optical hand shake correction system which includes a combination of a detection system for detecting a shake of a camera caused by such a hand shake as may arise, for example, from a shutter release, a control system for providing a correction amount to the lens position based on a signal outputted from the detection system and a driving system for shifting a predetermined lens based on an output of the control system.

With the optical hand shake correction system described above, it is possible to shift an image by shifting of the predetermined lens by means of the driving system, and blur of an image caused by a shake of the camera can be corrected by shifting of the predetermined lens by the driving system.

Such a hand shake correction optical system as just described is disclosed, for example, in Japanese Patent Laid-open No. 2002-244037 (hereinafter referred to as Patent Document 2), Japanese Patent Laid-open No. 2003-228001 (hereinafter referred to as Patent Document 3) or Japanese Patent Laid-open No. 2003-295057 (hereinafter referred to as Patent Document 4).

In the zoom lens disclosed in Patent Document 2, a third lens group disposed on the image side of an aperture stop includes a negative sub group and a positive sub group, and the positive sub group is shifted to shift an image.

In the zoom lens disclosed in Patent Document 3, a third lens group disposed on the image side of an aperture stop includes a positive sub group and a negative sub group, and the positive sub group is shifted to shift an image.

In the zoom lens disclosed in Patent document 4, an entire third lens group is shifted to shift an image.

In the hand shake correction optical systems described, a shift of an image caused by a hand shake or the like is corrected based on a blur correction coefficient.

Where the focal distance of the entire lens system is represented by f and the hand shake angle is represented by θ, the image shift amount yb by a hand shake is calculated in accordance with $$yb = f \cdot \tan \theta$$

The lens shift amount SL necessary to correct the image shift amount yb is given by $$SL = -f \cdot \tan \theta / \beta s$$

where βs is the blur correction coefficient. Therefore, as the blur correction coefficient βs increases, a hand shake can be corrected with a smaller lens shift amount SL.

SUMMARY OF THE INVENTION

However, where some lens of the third lens group or the entire third lens group is shifted to shift an image as in the zoom lenses disclosed in Patent Documents 2 to 4, the lens group to be shifted (a lens (group) which is shifted in a direction substantially perpendicular to the optical axis is hereinafter referred to as "shift lens group") is positioned in the proximity of the aperture stop. The arrangement of the shift lens group gives rise to a problem that interference of a driving mechanism for shifting the shift lens group with a mechanism for driving the aperture stop or with a mechanism for driving a lens group which is movable in the direction of the optical axis such as the second lens group or the fourth lens group is likely to occur. This complicates the structure of a housing and disturbs miniaturization of the zoom lens.

In order to solve the above-described problem of interference of the driving mechanism for shifting the shift lens with other driving mechanisms and so forth, it is a possible idea to shift, entirely or partly, a final lens group which is positioned nearest to the image side. In the final lens group, a flux of light is controlled so as to have a comparatively small variation in height of an off-axis light flux in order to obtain a telecentric configuration. Therefore, where the final lens group is formed as a shift lens group, various advantages are available including an advantage that the aberration variation by shifting of the lens group is small.

However, where the final lens group is shifted entirely or partly, the image plane shift factor has such a high value (hereinafter described in detail) that the image plane position is displaced by a great amount in the direction of the optical axis by a very small amount of movement of the shift lens group in the direction of the optical axis upon shifting and a subject image is likely to become an out-of-focus image.

The movement of the shift lens group is guided by a mechanical guide mechanism, and if the guide mechanism does not have some play with respect to the shift lens group (i.e., a frame which supports the shift lens group), then the movement of the shift lens group is impossible. Therefore, an increase of the image plane shift factor leads to no permission of any small shake of the shift lens group in the direction of the optical axis. This makes the tolerance in manufacture severe, increases the cost and, under certain circumstances, makes production impossible.

There is a need for the present invention to provide a zoom lens and an image pickup apparatus wherein the image plane movement upon lens shifting for hand shake correction is minimized.

In order to satisfy the need described above, according to an embodiment of the present invention, there is provided a zoom lens including a power variation section and a final lens group disposed in order from an object side, the power variation section composing at least two movable lens groups which are movable in a direction of an optical axis thereof to vary a lens position state from a wide angle end state to a telephoto end state, the final lens group being fixed in the direction of the optical axis independently of the lens position state, the final lens group composing three sub groups which compose a first sub group having a negative refracting power, a second sub group having a positive refracting power and a third sub group having a positive refracting power, disposed in order from the object side, the second sub group being shiftable in a direction substantially perpendicular to the optical axis to shift an image, a conditional expression (1) $0.2 < ft/fBt < 0.8$ being satisfied where ft is the focal distance of the entire lens system in the telephoto end state and fBt is the focal distance of entire lens groups disposed on the object side with respect to the third sub group in the telephoto end state.

In the zoom lens, the amount of movement of the image plane with respect to the amount of displacement of the shift lens group (second sub group of the final lens group) when the shift lens group is shifted in a direction perpendicular to the optical axis is very small.

In particular, in the zoom lens, the image plane shift factor can be suppressed while the blur correction coefficient can be raised. Where the blur correction coefficient is raised, a hand shake can be corrected with a reduced shift amount of the shift lens group. Consequently, an optimum shift amount with respect to an image blur, that is, a shift amount with which control is easy while increase in scale of a mechanism for moving the shift lens group can be prevented, can be selected. Besides, where the image plane shift factor is suppressed low, the amount of movement of the image plane with respect to the amount of displacement of the shift lens group in the direction of the optical axis can be suppressed is small.

Preferably, a conditional expression (2) $0.4 < fc/ft < 0.9$ is satisfied where fc is the focal distance of the third sub group. With the zoom lens, further enhancement of the picture quality can be achieved while sufficient miniaturization is anticipated.

Preferably, a conditional expression (3) $-0.5 < ft/fAt < -0.1$ is satisfied where ft is the focal distance of the entire lens system in the telephoto end state and fAt is the focal distance of entire lens groups disposed on the object side with respect to the second sub group in the telephoto end state. With the zoom lens, the blur correction coefficient can be set to a higher value while the image plane shift factor is suppressed lower.

Preferably, that one of lens faces of the second sub group which is disposed nearest to the object side is a convex face, and a conditional expression (4) $-0.1 < (RAI - RB0)/(PAI + RB0) < 0$ is satisfied where RAI is the radius of curvature of that one of the lens faces of the first sub group which is disposed nearest to the image side and RB0 is the radius of curvature of that one of lens faces of the second sub group which is disposed. nearest to the object side. With the zoom lens, coma which appears upon image shifting can be corrected favorably to achieve further enhancement of the performance.

Preferably, a conditional expression (5) $0.05 < \phi e/\phi w < 0.2$ is satisfied where $\phi e$ is the refracting power of the final lens group which is a reciprocal number to the focal distance and $\phi w$ is the refracting power of the entire lens system in the wide angle state which is a reciprocal number to the focal distance. With the zoom lens, further reduction of the overall lens length and the lens diameter can be anticipated.

The zoom lens may be configured such that the power variation section includes a first lens group having a positive refracting power, a second lens group having a negative refracting power and a third lens group having a positive refracting power, disposed in order from the object side, and when the lens position state varies from the wide angle end state to the telephoto end state, the distance between the first lens group and the second lens group increases while the distance between the second lens group and the third lens group decreases, the zoom lens further including an aperture stop disposed in the proximity of the third lens group. With the zoom lens, further reduction of the overall lens length can be anticipated, and the variation of off-axis aberration upon power variation can be corrected favorably.

Preferably, the power variation section further includes a fourth lens group disposed on the image side with respect to the third lens group and having a positive refracting power, the fourth lens group being movable upon variation of the lens position state and upon focusing at a short distance. With the zoom lens, when the fourth lens group is moved upon focusing at a short distance, the variation of the focal distance over the entire lens system and the variation of the angle of view are small.

According to another embodiment of the present invention, there is provided an image pickup apparatus including a zoom lens, and an image pickup element for converting an optical image formed by the zoom lens into an electric signal, the zoom lens composing a power variation section and a final lens group disposed in order from an object side, the power variation section composing at least two movable lens groups which are movable in a direction of an optical axis thereof to vary a lens position state from a wide angle end state to a telephoto end state, the final lens group being fixed in the direction of the optical axis independently of the lens position state, the final lens group composing three sub groups which compose a first sub group having a negative refracting power, a second sub group having a positive refracting power and a third sub group having a positive refracting power, disposed in order from the object side, the second sub group being shiftable in a direction substantially perpendicular to the optical axis to shift an image, a conditional expression (1) $0.2 < ft/fBt < 0.8$ being satisfied where ft is the focal distance of the entire lens system in the telephoto end state and fBt is the focal distance of the entire lens groups disposed on the object side with respect to the third sub group in the telephoto end state.

In the image pickup apparatus, since it includes the zoom lens of the present invention described above, hand shake correction can be performed while the image pickup apparatus is formed in a small size. Further, upon hand shake correction, an out-of-focus state rarely occurs, and consequently, an image of high quality can be obtained.

The image pickup apparatus may be configured such that the power variation section includes a first lens group having a positive refracting power, a second lens group having a negative refracting power and a third lens group having a positive refracting power, disposed in order from the object side, and when the lens position state varies from the wide angle end state to the telephoto end state, the distance between the first lens group and the second lens group increases while the distance between the second lens group and the third lens group decreases, the zoom lens further including an aperture stop disposed in the proximity of the third lens group. With the image pickup apparatus, further reduction of the overall lens length can be anticipated, and the variation of off-axis aberration upon power variation can be corrected favorably.

Preferably, the image pickup apparatus further includes a hand shake detection section for detecting a shake of the image pickup element, a hand shake control section for calculating a blur correction angle for correcting an image blur by the shake of the image pickup element detected by the hand shake detection section and signaling a driving signal for positioning the second sub group at a position based on the blur correction angle, and a hand shake driving section for receiving the driving signal signaled from the hand shake control section and shifting the second sub group in a direction perpendicular to the optical axis based on the received driving signal. With the image pickup apparatus, an image of high quality is acquired whose blur caused by a shake of the image pickup element by a hand shake or the like is corrected and whose various aberrations are corrected favorably while the image is taken up in a well-focused condition.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 11 is a similar view but illustrating spherical aberration, astigmatism, distortional aberration and coma in a telephoto end state of the zoom lens of FIG. 8 according to the numerical value example 2;

FIG. 16 is a diagrammatic view illustrating spherical aberration, astigmatism, distortional aberration and coma in a wide angle end state of the zoom lens of FIG. 15 according to a numerical value example 3 wherein particular numerical values are applied to the zoom lens;

DETAILED DESCRIPTION OF THE PREFERRED EMBODIMENTS

In the following, zoom lenses and an image pickup apparatus to which the present invention is applied are described with reference to the accompanying drawings.

A zoom lens according to the present invention includes a power variation section including at least two movable lens groups and a final lens group disposed on the image side of the power variation section and fixed in the direction of the optical axis. The final lens group includes three sub groups which include a first sub group having a negative refracting power, a second sub group having a positive refracting power and a third sub group having a positive refracting power, disposed in order from the object side. The second sub group is shiftable in a direction substantially perpendicular to the optical axis to shift an image. The zoom lens having the configuration described can suppress the image plane shift factor and enhance the blur correction coefficient.

Generally, the blur correction coefficient is a ratio of an image shift amount to a shift amount of a shift lens group in a direction perpendicular to the optical axis. Meanwhile, the image plane shift factor is a ratio of a variation amount of the image plane position to a displacement amount when the shift lens group is displaced in the direction of the optical axis. In other words, the blur correction coefficient indicates a sensitivity in a heightwise direction of an image and relates to a lateral magnification, and the image plane shift factor indicates a sensitivity of an image in the direction of the optical axis and relates to a longitudinal magnification.

Particularly in recent years, together with increase of the number of pixels and increase of the degree of integration of light receiving elements, it has become necessary to raise the positional accuracy in the direction of an optical axis, and it is necessary to reduce the image plane shift factor $\beta z$. However, since an image can be shifted by a predetermined amount by a smaller amount of movement as the blur correction coefficient $\beta s$ increases, the blur correction coefficient $\beta s$ should be set to a higher value. However, since the blur correction coefficient and the image plane shift factor have a relationship of a lateral magnification and a vertical magnification, in order to increase the blur correction coefficient and reduce the image plane shift factor, it is necessary to appropriately set the arrangement of the shift lens groups and the magnification.

First, a case wherein the lens group disposed nearest to the image side is formed as a shift lens group is examined.

For example, if the lens group disposed nearest to the image side is formed as a shift lens group, then where the magnification of the shift lens group is represented by $\beta B$, the blur correction coefficient $\beta s$ and the image plane shift factor $\beta z$ are represented respectively by $$\beta s = 1 - \beta B$$

$$\beta z = 1 - \beta S2$$

Figure 23:
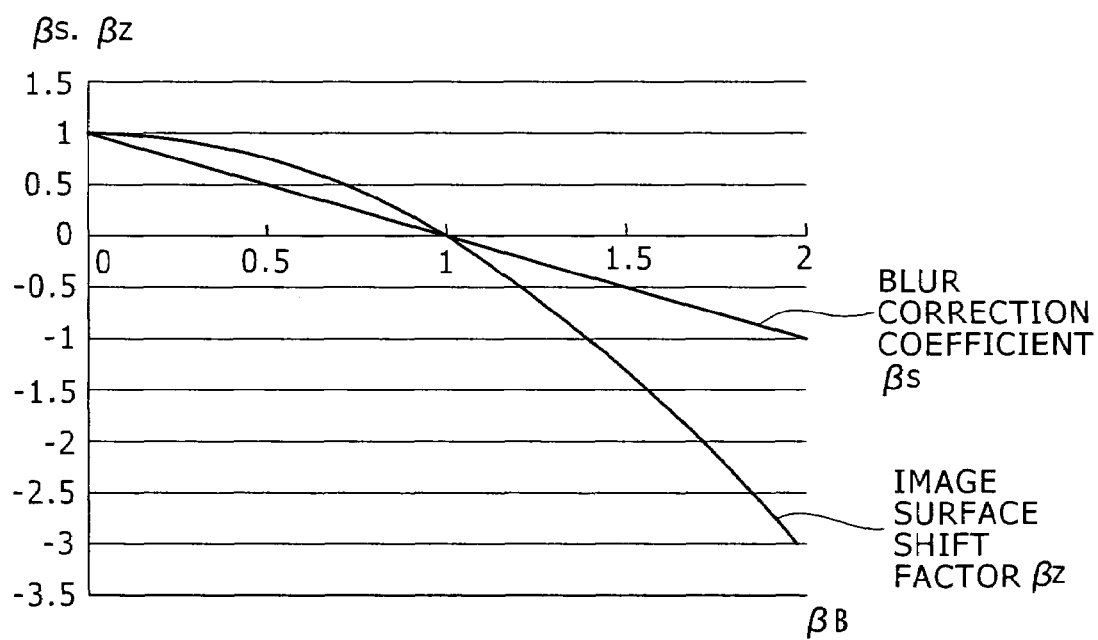
FIG. 23 is a diagram illustrating a relationship between a blur correction coefficient and an image plane shift factor.

FIG. 23 is a diagram wherein the axis of abscissa indicates the lateral magnification $\beta B$ of the shift lens group and the axis of ordinate indicates the blur correction coefficient $\beta s$ and the image plane shift factor $\beta z$. Where $\beta B > 1$, the shift lens group has a negative focal distance, and as $\beta B$ increases, $\beta z$ increases in proportion to the square of $\beta B$. Consequently, $|\beta z| > |\beta s|$ is reached and the image plane shift factor becomes very high. Where $1 > \beta B > 0$, the shift lens group has a positive focal distance, and as $\beta B$ approaches 0, $\beta z$ approaches 1 in proportion to the square of $\beta B$. Consequently, $\beta z > \beta s$ is reached.

It is to be noted that, where $0 > \beta B$, the refracting power of the shift lens group increases very much in the positive and it becomes difficult to favorably correct various aberrations which appear solely with the shift lens group. Therefore, the case of $0 > \beta B$ is placed out of consideration.

As described above, where that one of the lens groups of the optical system which are disposed nearest to the image side is shifted to shift an image, the image plane shift factor is so high that it becomes necessary to hold the shift lens group with a very high degree of stopping accuracy in the direction of the optical axis. As a result, also in order to shift the shift lens group in a direction perpendicular to the optical axis, higher thrust force becomes required, resulting in complication and increase in size of the structure.

In the zoom lens of the present invention, the final lens group includes a first sub group having a negative refracting power, a second sub group having a positive refracting power and a third sub group having a positive refracting power, disposed in order from the object side and the second sub group is formed as a shift lens group and shifted in a direction perpendicular to the optical axis so that the image plane shift factor $\beta z$ is suppressed while the blur correction coefficient is increased.

Where the magnification of the second sub group which is a shift lens group is represented by $\beta B$ and the magnification of the third sub group is represented by $\beta C$, the blur correction coefficient $\beta s$ and the image plane shift factor $\beta z$ are represented respectively by $$\beta s = (1-\beta B)\beta C$$

$$\beta z = (1-\beta B^2)\beta C^2$$

As a result, since the blur correction coefficient $\beta s$ and the image plane shift factor $\beta z$ can be calculated from the two magnifications $\beta B$ and $\beta C$, they can be set closer to respective predetermined values independently of each other.

In the zoom lens of the present invention, it is possible to lower the image plane shift factor $\beta z$ making use of the fact that, where the magnification $\beta C$ of the third sub group is set so as to satisfy $0 < \beta C < 1$, $\beta C$ has an influence by the square thereof on the image plane shift factor $\beta z$.

Although the image plane shift factor $\beta z$ can be reduced with respect to the blur correction coefficient $\beta s$ if the magnification of the third sub group is set closer to 0 as described above, in an actual configuration of an optical system, it is necessary to set the exit pupil position appropriately.

As the lateral magnification of the third sub group approaches 0, if the total length of the lens is fixed, then the refracting power of the third sub group increases. Since an off-axis light flux and a main light flux which pass the third sub group come to the image pickup element such that the off-axis light flux is spaced away from the optical axis and the main light flux approaches the optical axis, eclipse of the light flux by a microlens array appears, resulting in shortage of the light amount at peripheral portions of the screen. In particular, a microlens array is an array of very small lens elements disposed immediately forwardly of photoelectric conversion elements of an image pickup device in order to introduce fluxes of light which are to come to regions between adjacent ones of the photoelectric conversion elements to the photoelectric conversion elements. However, if the angles defined by a main light flux which comes to the photoelectric conversion elements and the optical axis become large angles, then off-axis light fluxes which are directed to peripheral portions of a screen exhibit large angles with respect to the optical axis. As a result, the light flux does not come to the photoelectric conversion elements at peripheral portions of the screen, resulting in a shortage of the amount of light.

Therefore, according to the zoom lens of the present invention, it is necessary for a conditional expression (1)

$$0.2 < ft/fBt < 0.8 \tag{1}$$

to be satisfied where ft is the focal distance of the entire lens system in the telephoto end state and fBt is the focal distance of entire lens groups disposed on the object side with respect to the third sub group in the telephoto end state.

The conditional expression above defines the magnification of the third sub group.

The focal distance ft of the entire lens system can be calculated from the magnification $\beta C$ of the third sub group in accordance with $$ft = fBt \cdot \beta C$$

and by transforming this expression, $$\beta C = ft/fBt$$

is obtained. Accordingly, the conditional expression (1) defines the magnification of the third sub group. In other words, the magnification cannot be measured directly but can be confirmed through measurement of ft and fBt above, and therefore, the magnification is represented not from a magnification but indirectly from a focal distance.

If the magnification is higher than the upper limit value of the conditional expression (1), then since the image plane shift factor becomes excessively high, a mechanism for holding the second sub group, which is a shift lens group upon shifting, is complicated in order to control a shake of the second sub group in the direction of the optical axis.

If the magnification decreases lower than the lower limit value of the conditional expression (1), then the blur correction coefficient becomes excessively low, and the shift amount of the second sub group necessary to shift the image by a predetermined amount increases. This gives rise to an increase in scale of a mechanism for driving the second sub group.

In the zoom lens of the present invention, in order to achieve further miniaturization and further enhancement of the performance, preferably the focal distance of the third sub group is set appropriately.

If the focal distance of the third sub group decreases, then the back focus distance decreases and reduction of the total length of the lens can be achieved. However, since conversely an off-axis light flux which passes the third sub group is spaced away from the optical axis, coma which appears at peripheral portions of the screen cannot be corrected better.

On the other hand, if the focal distance of the third sub group increases, then a reverse phenomenon occurs.

Therefore, according to the zoom lens of the present invention, in order to achieve further miniaturization and further enhancement of the performance, a conditional expression (2)

$$0.4 < fc/ft < 0.9 \tag{2}$$

is satisfied where fc is the focal distance of the third sub group.

The conditional expression (2) above defines the focal distance of the third sub group.

If the ratio fc/ft decreases lower than the lower limit value of the conditional expression (2), then since the refracting power of the third sub group increases, an off-axis light flux which passes the third sub group is spaced away from the optical axis. Consequently, coma which appears at peripheral portions of the screen cannot be corrected favorably and sufficient enhancement of the performance cannot be anticipated.

Further, since the magnification of the third sub group decreases, the back focus distance becomes shorter, and a main light flux comes to the image pickup element in such a manner that it approaches the optical axis. Consequently, the angle defined between the main light flux and the optical axis becomes large, and shortage of the light amount at peripheral portions of the screen is likely to occur.

On the other hand, if the ratio fc/ft increases higher than the upper limit value of the conditional expression (2), then since the back focus distance becomes longer, sufficient miniaturization cannot be anticipated.

As regards the blur correction coefficient and the image plane shift factor, it is possible to raise the blur correction coefficient and lower the image plane shift factor by appropriately setting the magnification of the third sub group as described hereinabove. However, it is possible to further raise the blur correction coefficient and further lower the image plane shift factor by appropriately setting the lateral magnification of the second sub group simultaneously.

In particular, by setting the lateral magnification $\beta B$ of the second sub group to $\beta B < 0$, $(1-\beta B)$ required in order to calculate the blur correction coefficient $\beta s$ can be set higher than $(1-\beta B^2)$ which is required in order to calculate the image plane shift factor $\beta z$.

In the zoom lens of the present invention, in order to set the blur correction coefficient to a higher value while the image plane shift factor is suppressed to a lower value, preferably the lateral magnification $\beta B$ of the second sub group is set appropriately. In particular, preferably a conditional expression (3)

$$-0.5 < ft/fAt < -0.1 \tag{3}$$

is satisfied where ft is the focal distance of the entire lens system in the telephoto end state and fAt is the focal distance of entire lens groups disposed on the object side with respect to the second sub group in the telephoto end state.

The conditional expression (3) above defines the lateral magnification $\beta B$ of the second sub group.

Where the focal distance fAt of the entire lens system disposed on the object side with respect to the second sub group is fAt<0, $\beta B$<0 is satisfied, and as fAt increases in the negative, $\beta B$ also increases in the negative. Consequently, the blur correction coefficient can be set higher while the image plane shift factor is suppressed lower.

Where the ratio ft/fAt decreases below the lower limit of the conditional expression (3), a light flux emitted from the first sub group is placed into a more divergent state. Consequently, the light flux emitted from the first sub group diverges strongly and an off-axis light flux which passes the second sub group is spaced away from the optical axis. Therefore, coma which appears at peripheral portions of the screen increases extremely.

On the other hand, if the ratio ft/fAt increases higher than the upper limit of the conditional expression (3), then a light flux emitted from the first sub group approaches parallel light, and the blur correction coefficient decreases and the image plane shift factor increases. This is contrary to the main point of the present invention of increasing the blur correction coefficient and decreasing the image plane shift factor and therefore is not preferable.

In the zoom lens of the present invention, in order to favorably correct coma which appears upon image shifting to achieve further enhancement of the performance, preferably that one of the lens faces of the second sub group which is disposed nearest to the object side is a convex face, and a conditional expression (4)

$$-0.1 < (RAI-RB0)/(RAI+RB0) < 0 \tag{4}$$

is satisfied where RAI is the radius of curvature of that one of the lens faces of the first sub group which is disposed nearest to the image side and RB0 is the radius of curvature of that one of the lenses of the second sub group which is disposed nearest to the object side.

In the zoom lens of the present invention, the second sub group has a positive refracting power, and in order to achieve reduction of the total length of the zoom lens, preferably that one of the lens faces of the second sub group which is disposed nearest to the object side is a convex face.

Then, by appropriately setting the air distance formed between the first sub group and the second sub group, the variation of coma which appears at peripheral portions of the screen upon image shifting can be suppressed. In particular, it is essentially required to set the radius of curvature of that one of the lens faces of the first sub group which is disposed nearest to the image side and the radius of curvature of that one of the lens faces of the second sub group which is disposed nearest to the object side so as to be near to each other.

The conditional expression (4) above defines, taking the foregoing into consideration, an appropriate range with regard to the shape of the air distance formed between the first sub group and the second sub group.

If the ratio (RAI−RB0)/(RAI+RB0) is higher than the upper limit value or is lower than the lower limit value of the conditional expression (4), then it is difficult to favorably correct the variation of coma which appears at peripheral portions of the screen upon image shifting, which makes further enhancement of the performance difficult.

While the zoom lens of the present invention includes a power variation section and a final lens group disposed on the image side of the power variation section, the final lens group is not removable different from a rear conversion lens. Particularly, the power variation section and the final lens group are not subject to aberration correction independently of each other but achieve a predetermined optical performance only in a combined condition. Thus, by appropriately setting the refracting power also of the final lens group, further reduction of the overall length of the zoom lens and further reduction of the lens diameter can be anticipated. In particular, preferably a conditional expression (5)

$$0.05<\phi e/\phi w<0.2 \qquad (5)$$

is satisfied where $\phi e$ is the refracting power of the final lens group which is a reciprocal number to the focal distance and $\phi w$ is the refracting power of the entire lens system in the wide angle state which is a reciprocal number to the focal distance.

The conditional expression (5) defines the refracting power of the final lens group.

If the refracting power of the final lens group increases in the negative, then the exit pupil position of the entire lens system approaches the image plane position, that is, a main light flux comes to the image plane position in such a manner that it is spaced away from the optical axis. Therefore, if the ratio $\phi e/\phi w$ decreases lower than the lower limit value of the conditional expression (5) and the refracting power of the final lens group increases in the negative, a drop of the light amount is liable to become conspicuous at peripheral portions of the screen.

On the contrary, when the refracting power of the final lens group increases in the positive, a main light flux comes to the image plane position in such a manner that it approaches the optical axis. Therefore, if the ratio $\phi e/\phi w$ increases higher than the upper limit value of the conditional expression (5) and the refracting power of the final lens group increases in the positive, then the lens diameter of the final lens group becomes excessively large. Consequently, sufficient miniaturization cannot be anticipated.

Preferably, the zoom lens of the present invention is configured such that the power variation section thereof includes a first lens group having a positive refracting power, a second lens group having a negative refracting power and a third lens group having a positive refracting power, disposed in order from the object side, and when the lens position state varies from the wide angle end state having the shortest focal distance to the telephoto end state having the longest focal distance, the distance between the first lens group and the second lens group increases while the distance between the second lens group and the third lens group decreases, the zoom lens further including an aperture stop disposed in the proximity of the third lens group.

Where the first lens group having a positive refracting power is disposed nearest to the object side, reduction of the overall length of the zoom lens and reduction of the diameter of the aperture stop can be anticipated.

In a wide angle end state, if the distance between the second lens group and the aperture stop is increased, then an off-axis light flux which passes the second lens group passes in a spaced relationship from the optical axis. Further, if the distance between the second lens group and the aperture stop is decreased when the lens position state varies from a wide angle end state to a telephoto end state, then an off-axis light flux which passes the second lens group approaches the optical axis. As a result, the variation of off-axis aberration which appears upon variation of the lens position state can be corrected favorably. Further, in a wide angle end state, by disposing the first lens group and the second lens group closely to each other to prevent an off-axis light flux which passes the first lens group from being in a spaced relationship from the optical axis, off-axis aberration can be corrected favorably. Furthermore, by increasing the distance between the first lens group and the second lens group toward a telephoto end state, since an off-axis light flux which passes the first lens group is spaced away from the optical axis, the variation of off-axis aberration can be corrected favorably making use of the variation of the height.

In the zoom lens of the present invention, preferably the power variation section further includes a fourth lens group disposed on the image side with respect to the third lens group and having a positive refracting power, the fourth lens group being movable upon variation of the lens position state and upon focusing at a short distance.

This is because, when the fourth lens group moves upon focusing at a short distance, the variation of the focal distance of the entire lens system is small and the variation of the angle of view is small.

Further, where the fifth lens group which is the final lens group is disposed on the image side of the fourth lens group, the number of lenses of the fourth lens group which is a movable lens group can be reduced thereby to reduce the weight. Consequently, a mechanism for driving the fourth lens group can be configured simply and in a small size, and accordingly, miniaturization of the lens system can be anticipated.

In the zoom lens of the present invention, since an aspheric lens is used, a higher optical performance can be implemented. Particularly by introducing an aspheric face into the final lens group, further enhancement of a central performance can be anticipated. Further, where an aspheric lens is used for the second lens group, it is also possible to favorably correct the variation of coma which is caused by the angle of view which appears in a wide angle end state.

Naturally, a higher optical performance can be obtained by using a plurality of aspheric faces in one optical system.

Naturally, also it is possible to dispose a low-pass filter on the image side of the lens system in order to prevent appearance of moiré fringes or dispose an infrared ray cutting filter in response to a spectral sensitivity characteristic of the image pickup device.

In the following, zoom lenses of several embodiments of the present invention and several numerical value examples in which particular numerical values are applied to the zoom lenses are described.

It is to be noted that, while an aspheric face is used in the zoom lenses of the embodiments, the aspheric face shape is represented by the following expression:

$$x = cy^2/(1+(1-(1+\kappa)c^2y^2)^{1/2}) + Ay^4 + By^6 + \ldots$$

where y is the height from the optical axis, x the amount of sag, c the curvature, κ the conical constant, and A, B, . . . represent aspheric constants.

Figure 1:
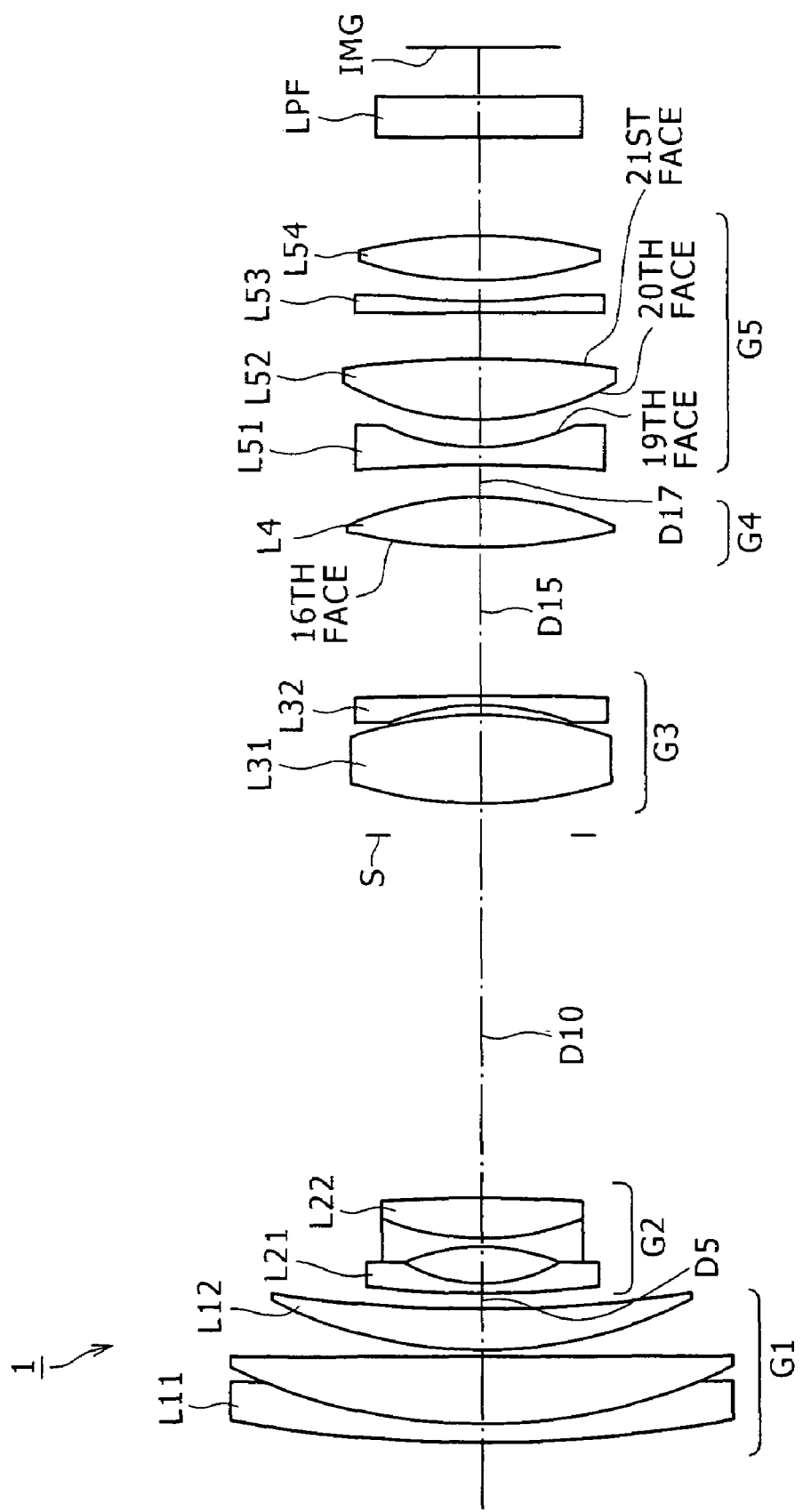
FIG. 1 is a schematic view showing a configuration of a zoom lens to which the present invention is applied.

FIG. 1 illustrates a lens configuration of the zoom lens according to the first embodiment of the present invention is applied. Referring to FIG. 1, the zoom lens 1 includes a first lens group G1 having a positive refracting power, a second lens group G2 having a negative refracting power, a third lens group G3 having a positive refracting power, a fourth lens group G4 having a positive refracting power and a fifth lens group G5 having a positive refracting power, disposed in order from the object side. Upon power variation from a wide angle end state to a telephoto end state, the second lens group G2 moves to the image side such that the air distance between the first lens group G1 and the second lens group G2 increases while the air distance between the second lens group G2 and the third lens group G3 decreases. At this time, the first lens group G1, third lens group G3 and fifth lens group G5 are fixed in the direction of the optical axis, and the fourth lens group G4 moves so as to correct the variation of the image plane position caused by the movement of the second lens group G2. Further, upon focusing at a short distance, the fourth lens group G4 moves to the object side. It is to be noted that a low-pass filter LPF is disposed between the fifth lens group G5 and an image formation plane IMG.

The first lens group G1 includes a cemented lens L11 of a negative lens of a meniscus shape having a convex face directed to the object side and a positive lens having a convex face directed to the object side, and a positive lens L12 having a convex face directed to the object side. The second lens group G2 includes a negative lens L21 having a concave face directed to the image side, and a cemented lens L22 of a negative lens of a biconcave shape and a positive lens having a convex face directed to the object side. The third lens group G3 includes a biconvex lens L31, and a negative lens L32 having a concave face directed to the object side. The fourth lens group G4 includes a biconvex lens L4 having an aspheric face on the object side. The fifth lens group G5 includes a biconcave lens L51 having an aspheric face on the image side, a biconvex lens L52 having aspheric faces on the opposite sides thereof, a negative lens L53 having a concave face directed to the image side, and a biconvex lens L54.

In the zoom lens 1 of the first embodiment, the first to fourth lens groups G1 to G4 form a power variation section, and an aperture stop S is disposed on the object side of the third lens group G3 and is fixed in the direction of the optical axis irrespective of the variation of the lens position state. Further, the fifth lens group G5 is a final lens group, and the biconcave lens L51 functions as a first sub group; the biconvex lens L52 and the negative lens L53 having a concave face directed to the image side function as a second sub group; and the biconvex lens L54 functions as a third sub group. The second sub group can be shifted in a direction perpendicular to the optical axis to shift an image.

Numerical values of various dimensions of a numerical value example 1 wherein particular numerical values are applied to the zoom lens of the first embodiment are indicated in Table 1 below. In Table 1 and tables which indicate values of various dimensions of the other numerical value examples hereinafter described, the face number indicates the ith face as counted from the object side; the radius of curvature indicates the radius of curvature of the ith face; the face distance indicates the distance between the ith face and the i+1th face; the refractive index indicates the refractive index of the glass material having the ith face on the object side with regard to the d-line (λ=587.6 nm), and the Abbe number indicates the Abbe number of the glass material having the ith face on the object side with regard to the d-line (λ=587.6 nm). Further, the radius of curvature of 0 represents that the face is flat.

TABLE 1

| Face number | Radius of curvature | Face distance | Refractive index | Abbe number |
|---|---|---|---|---|
| 1: | 15.5497 | 0.145 | 1.92286 | 20.9 |
| 2: | 5.2554 | 0.594 | 1.75500 | 52.3 |
| 3: | −35.5258 | 0.036 | | |
| 4: | 4.1675 | 0.350 | 1.83500 | 43.0 |
| 5: | 13.2312 | (D5) | | |
| 6: | 13.2312 | 0.073 | 1.88300 | 40.8 |
| 7: | 1.6464 | 0.316 | | |
| 8: | −1.7372 | 0.073 | 1.83500 | 43.0 |
| 9: | 2.0883 | 0.336 | 1.92286 | 20.9 |
| 10: | −10.6137 | (D10) | | |
| 11: | 0.0000 | 0.309 | Aperture stop | |
| 12: | 4.5831 | 0.799 | 1.88300 | 40.8 |
| 13: | −3.0345 | 0.082 | | |
| 14: | −2.3375 | 0.073 | 1.84666 | 23.8 |
| 15: | −13.1923 | (D15) | | |
| 16: | 4.3011 | 0.437 | 1.48749 | 70.4 |
| 17: | −2.5447 | (D17) | | |
| 18: | −6.3905 | 0.163 | 1.69350 | 53.3 |
| 19: | 2.1222 | 0.234 | | |
| 20: | 2.2351 | 0.561 | 1.77250 | 49.6 |
| 21: | −5.4255 | 0.405 | | |
| 22: | −37.9247 | 0.091 | 1.92286 | 20.9 |
| 23: | 4.5382 | 0.218 | | |
| 24: | 4.2752 | 0.358 | 1.48749 | 70.4 |
| 25: | −4.1970 | 0.857 | | |
| 26: | 0.0000 | 0.372 | 1.51680 | 64.2 |
| 27: | 0.0000 | (Bf) | | |

When the lens position state varies from a wide angle end state to a telephoto end state, the face distance D5 between the first lens group G1 and the second lens group G2, the face distance D10 between the second lens group G2 and the aperture stop S, the face distance D15 between the third lens group G3 and the fourth lens group G4 and the face distance D17 between the fourth lens group G4 and the fifth lens group G5 vary. Thus, the values of the face distances in the numerical value example 1 in the wide angle end state, in an intermediate focal length state between the wide angle end and the telephoto end, and in the telephoto end state are indicated in Table 2 below together with those of the focal length f, F number FNO. and angle of view 2ω.

TABLE 2

| | f | 1.00~4.09~9.07 | |
| | FNO | 1.85~2.59~2.92 | |
| | 2ω | 65.34~15.01~6.63° | |

| | f | | |
| --- | --- | --- | --- |
| | 1.000 | 4.086 | 9.071 |
| D5 | 0.163 | 2.309 | 3.313 |
| D10 | 3.295 | 1.149 | 0.145 |
| D15 | 1.337 | 0.445 | 1.333 |
| D17 | 0.290 | 1.182 | 0.294 |
| Bf | 0.453 | 0.453 | 0.453 |

The 16th, 19th, 20th and 21st faces in the zoom lens 1 are each formed from an aspheric face, and aspheric coefficients of the aspheric faces in the numerical value example 1 are indicated in Table 3 below. It is to be noted that, in Table 3 and succeeding tables in which an aspheric coefficient is indicated, "E-i" is an exponential expression wherein the base is 10, that is, "$10^{-i}$", and for example, "0.12345E-05" represents "$0.12345 \times 10^{-5}$".

TABLE 3

| 16th face | κ = 1.900680 | A = −0.268514E−01 | B = −0.184990E−02 | C = 0.219751E−02 |
| | | D = −0.709103E−03 | | |
| 19th face | κ = −0.444054 | A = −0.532129E−02 | B = −0.430771E−02 | C = 0.165972E−03 |
| | | D = 0.300693E−02 | | |
| 20th face | κ = 1.440071 | A = −0.247630E−01 | B = −0.941675E−02 | C = 0.381926E−02 |
| | | D = −0.365922E−02 | | |
| 21st face | κ = 0.000000 | A = 0.837370E−02 | B = 0.172757E−02 | C = 0.000000E+00 |
| | | D = 0.000000E+00 | | |

Corresponding values to the conditional expressions of the numerical value example 1 are indicated in Table 4 below:

TABLE 4

| f Bt = 14.644 |
| f c = 4.405 |
| f At = −50.539 |
| φ e = 0.117 |
| (1) f t/f Bt = 0.619 |
| (2) f c/f t = 0.486 |
| (3) f t/f At = −0.179 |
| (4) (RA1 − RB0)/(RA1 + RB0) = −0.026 |
| (5) φ e/φ w = 0.117 |

Figure 2:
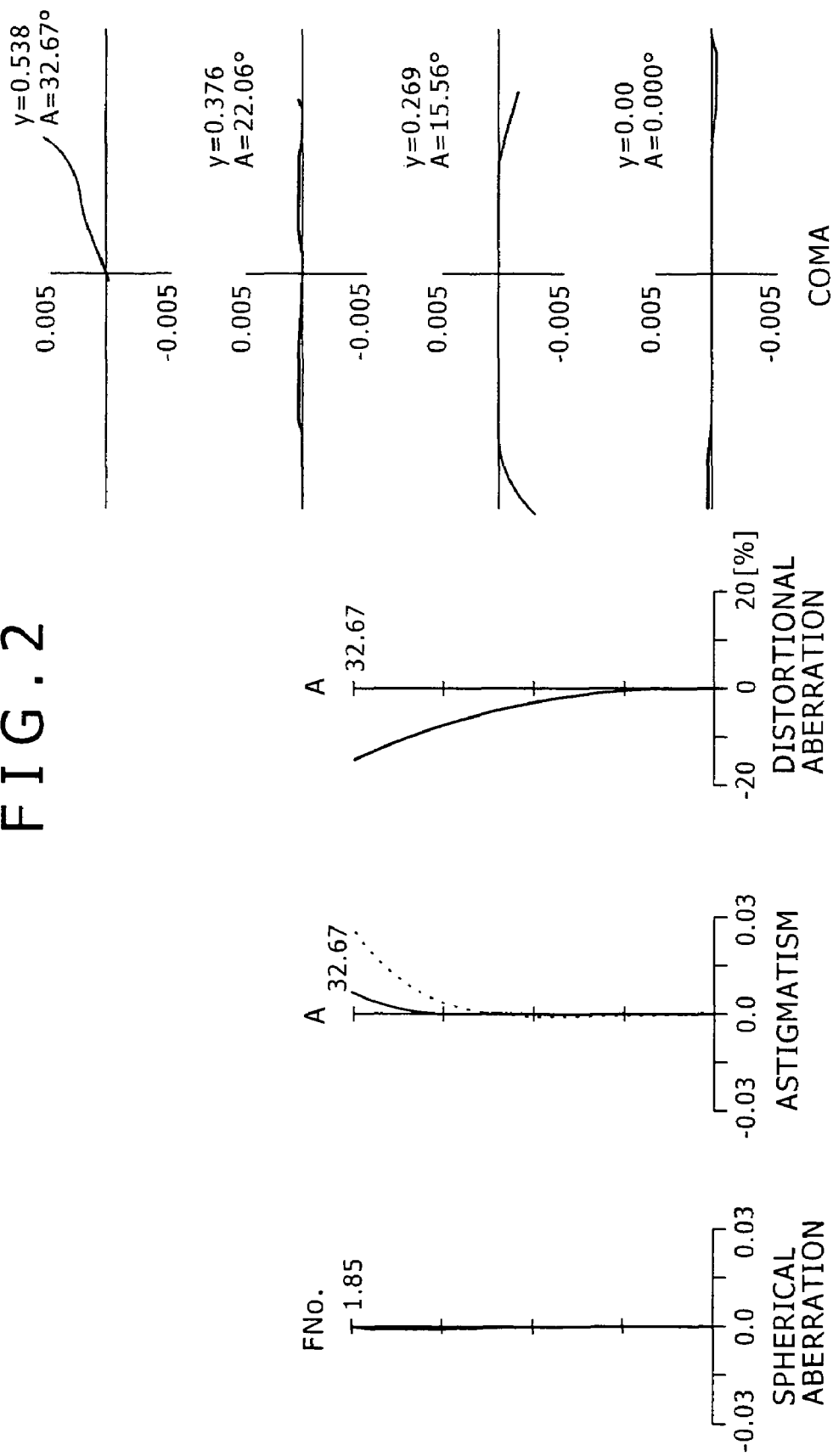
FIG. 2 is a diagrammatic view illustrating spherical aberration, astigmatism, distortional aberration and coma in a wide angle end state of the zoom lens of FIG. 1 according to a numerical value example 1 wherein particular numerical values are applied to the zoom lens.
Figure 3:
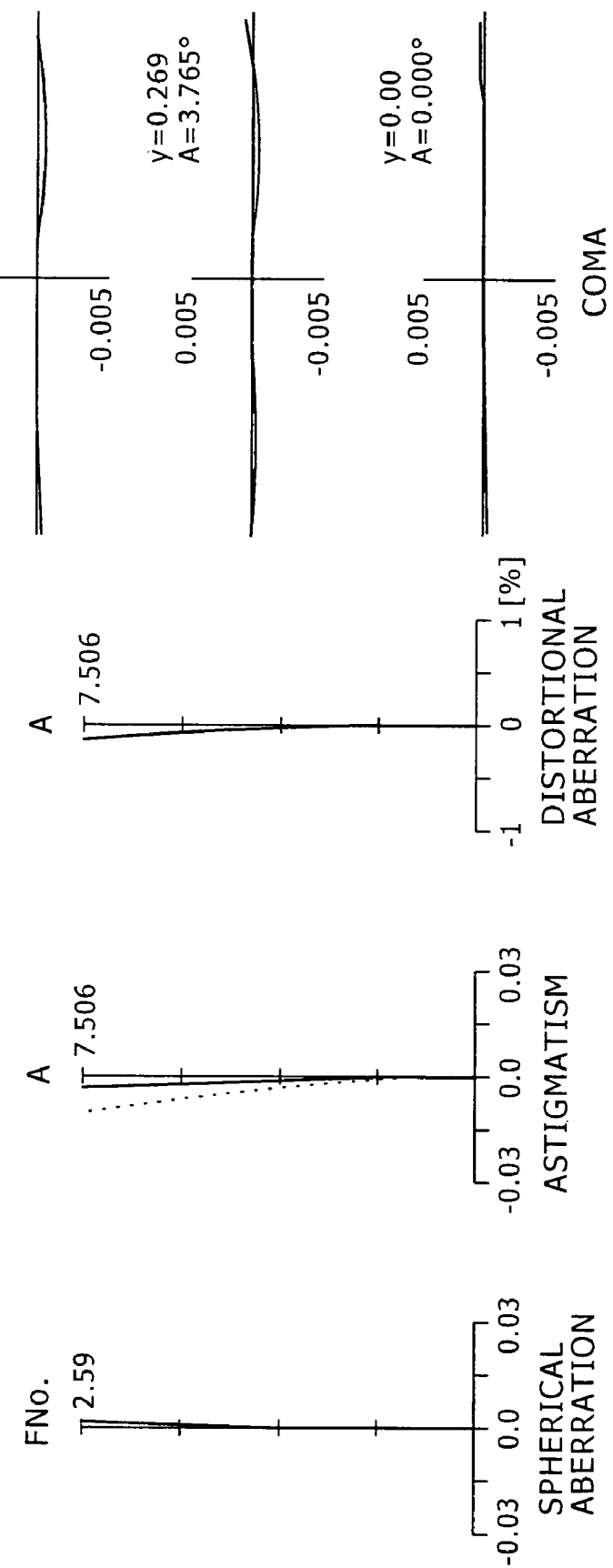
FIG. 3 is a similar view but illustrating spherical aberration, astigmatism, distortional aberration and coma in an intermediate focal length state of the zoom lens of FIG. 1 according to the numerical value example 1.
Figure 4:
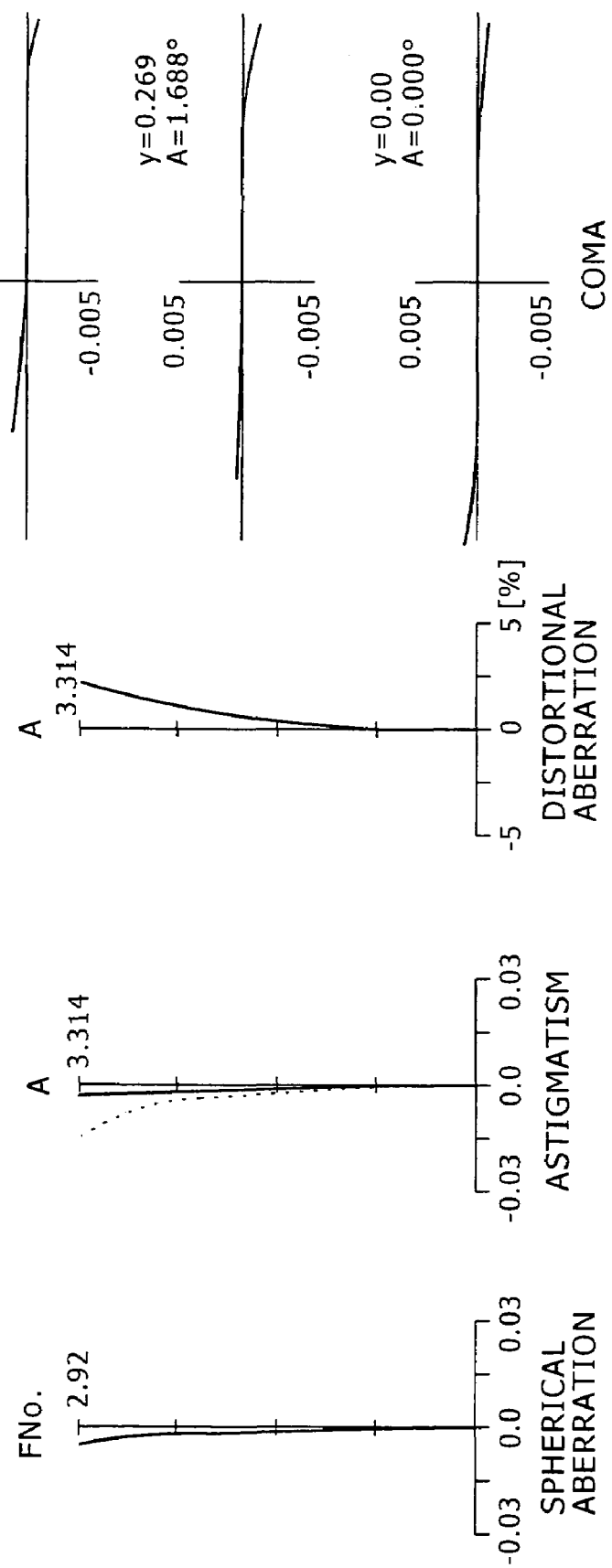
FIG. 4 is a similar view but illustrating spherical aberration, astigmatism, distortional aberration and coma in a telephoto end state of the zoom lens of FIG. 1 according to the numerical value example 1.

FIGS. 2 to 4 illustrate various aberrations in a focused state on infinity in the numerical value example 1. Particularly, FIG. 2 illustrates various aberrations in a wide angle end state (f=1.000); FIG. 3 illustrates various aberrations in an intermediate focal length state (f=4.086); and FIG. 4 illustrates various aberrations in a telephoto end state (f=9.071).

In the aberration diagrams of FIGS. 2 to 4, a solid line in a spherical aberration diagram indicates spherical aberration, and a solid line in an astigmatism diagram indicates a sagittal image plane and a broken line indicates a meridional image plane. In a coma diagram, A indicates a half angle of view, and y indicates an image height.

Figure 5:
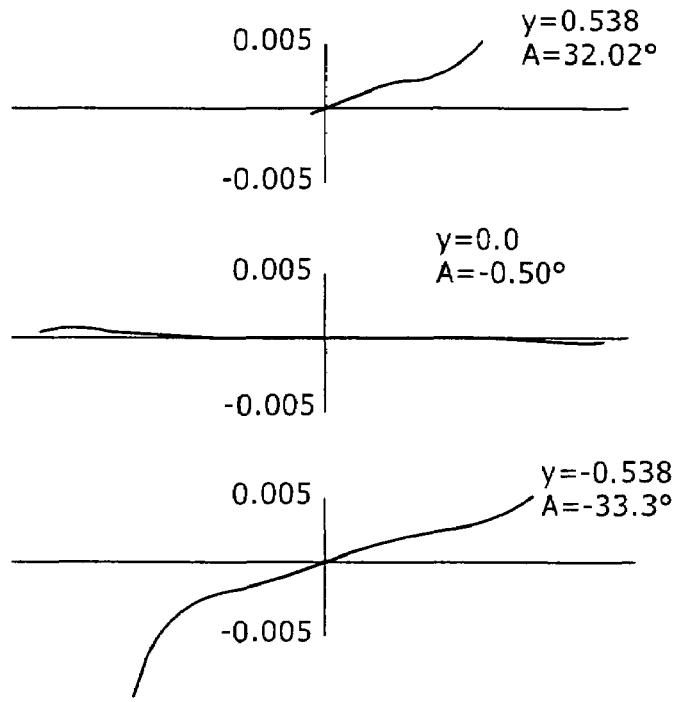
FIG. 5 is a diagrammatic view illustrating lateral aberration in a lens shift state by 0.5 degrees in a wide angle end state of the zoom lens of FIG. 1 according to the numerical value example 1.
Figure 6:
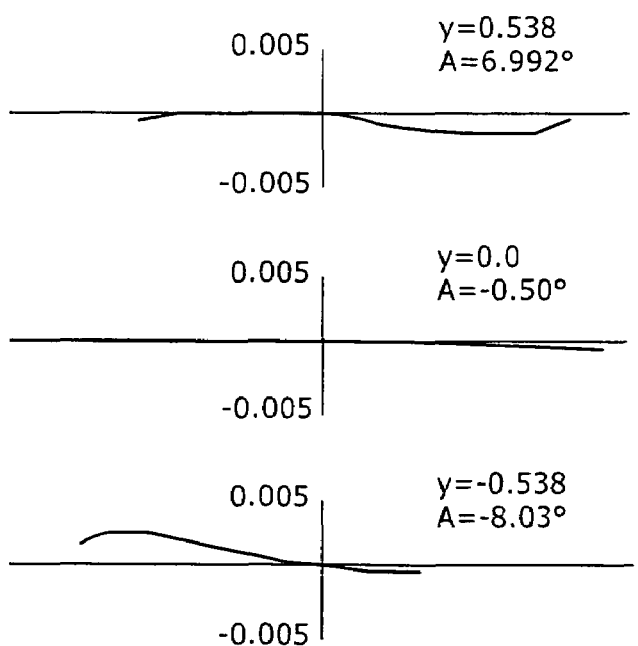
FIG. 6 is a similar view but illustrating lateral aberration in a lens shift state by 0.5 degrees in an intermediate focal length state of the zoom lens of FIG. 1 according to the numerical value example 1.
Figure 7:
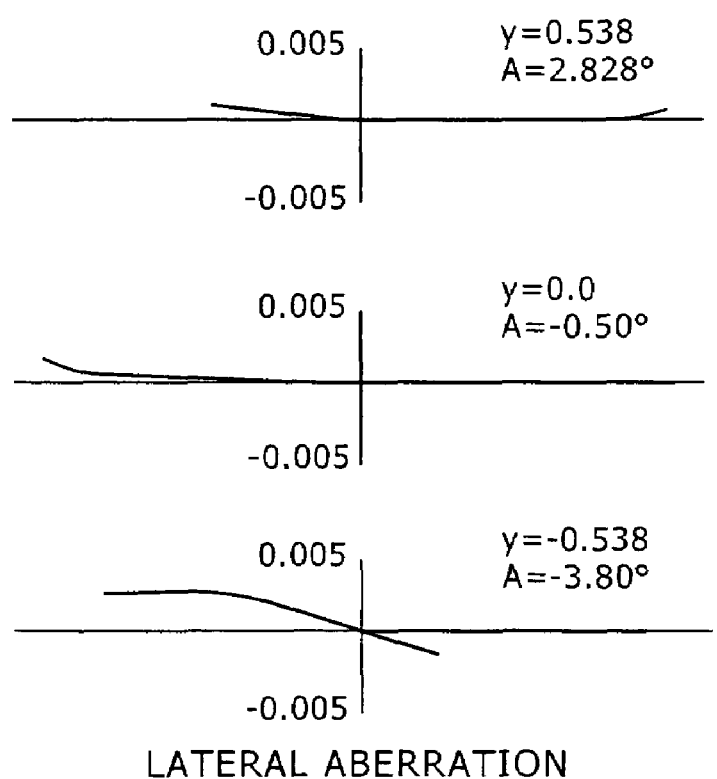
FIG. 7 is a similar view but illustrating lateral aberration in a lens shift state by 0.5 degrees in a telephoto end state of the zoom lens of FIG. 1 according to the numerical value example 1.

FIGS. 5 to 7 illustrate lateral aberration diagrams in a lens shift state corresponding to 0.5 degrees in a focused state on infinity in the numerical value example 1. Particularly, FIG. 5 shows a lateral aberration diagram in a wide angle end state (f=1.000) of the zoom lens; FIG. 6 shows a lateral aberration diagram in an intermediate focal length state (f=4.086); and FIG. 7 shows a lateral aberration diagram in a telephoto end state (f=9.071).

It can be seen apparently from the tables and the aberration diagrams that the numerical value example 1 satisfies the conditional expressions (1) to (5) given hereinabove and indicates favorably corrected aberrations and therefore has a superior image forming property.

Figure 8:
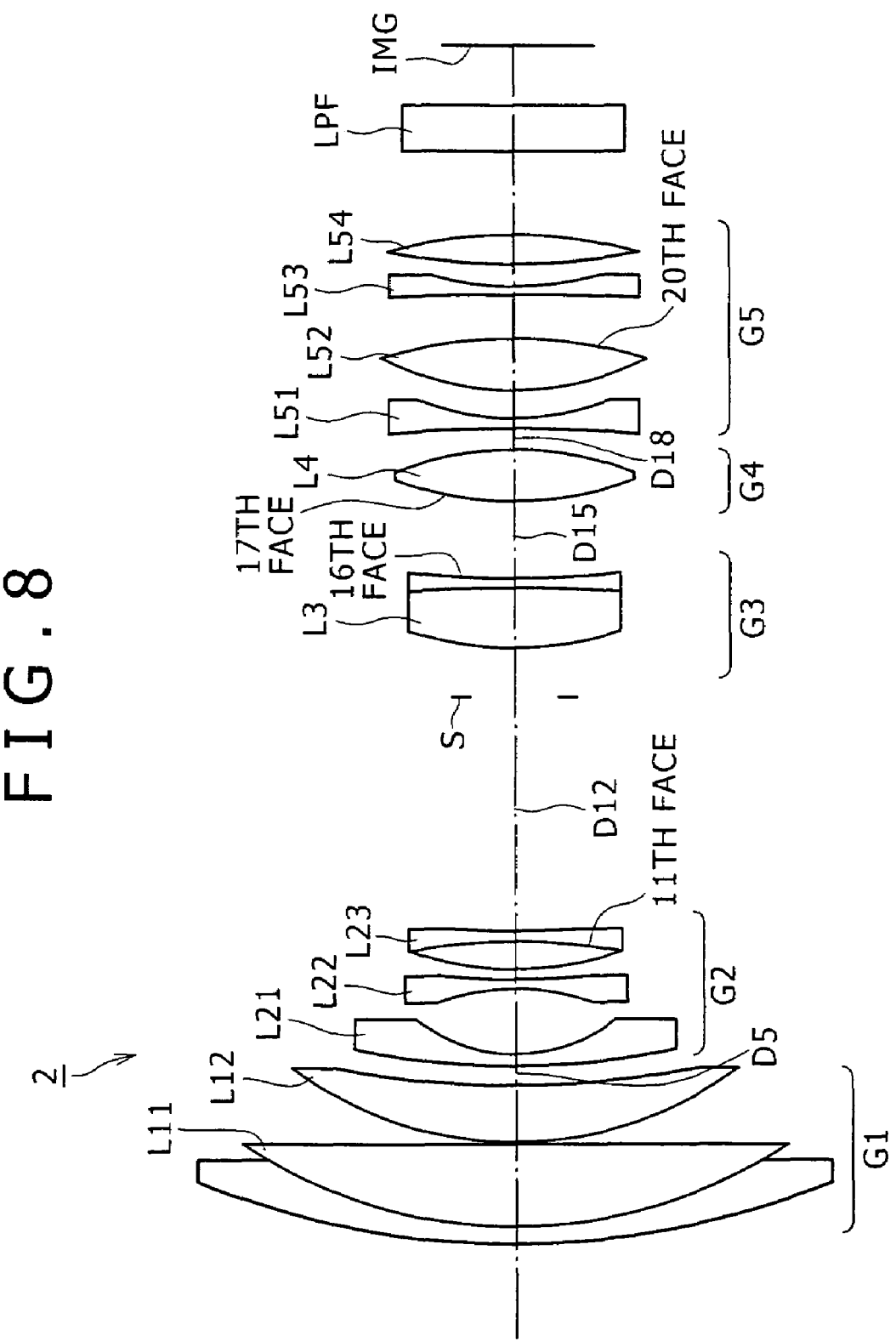
FIG. 8 is a schematic view showing a configuration of another zoom lens to which the present invention is applied.

FIG. 8 illustrates a lens configuration of the zoom lens according to the second embodiment of the present invention. Referring to FIG. 8, the zoom lens 2 includes a first lens group G1 having a positive refracting power, a second lens group G2 having a negative refracting power, a third lens group G3 having a positive refracting power, a fourth lens group G4 having a positive refracting power-and a fifth lens group G5 having a positive refracting power, disposed in order from the object side. Upon power variation from a wide angle end state to a telephoto end state, the second lens group G2 moves to the image side such that the air distance between the first lens group G1 and the second lens group G2 increases while the air distance between the second lens group G2 and the third lens group G3 decreases. At this time, the first lens group G1, third lens group G3 and fifth lens group G5 are fixed in the direction of the optical axis, and the fourth lens group G4 moves so as to correct the variation of the image plane position caused by the movement of the second lens group G2. Further, upon focusing at a short distance, the fourth lens group G4 moves to the object side. It is to be noted that a low-pass filter LPF is disposed between the fifth lens group G5 and an image formation plane IMG.

The first lens group G1 includes a cemented lens L11 of a negative lens of a meniscus shape having a convex face directed to the object side and a positive lens having a convex face directed to the object side, and a positive lens L12 having a convex face directed to the object side. The second lens group G2 includes a negative lens L21 having a concave face directed to the image side, a negative lens L22 of a biconcave shape, and a cemented lens L23 of a biconvex lens having an aspheric face on a cemented interface thereof and a biconcave lens. The third lens group G3 includes a cemented lens L3 of a biconvex lens and a biconcave lens having an aspheric face on the image side. The fourth lens group G4 includes a biconvex lens L4 having an aspheric face on the object side. The fifth lens group G5 includes a biconcave lens L51 having an aspheric face on the image side, a biconvex lens L52, a negative lens L53 having a concave face directed to the image side, and a biconvex lens L54.

In the zoom lens 2 of the second embodiment, the first to fourth lens groups G1 to G4 form a power variation section, and an aperture stop S is disposed on the object side of the third lens group G3 and is fixed in the direction of the optical axis irrespective of the variation of the lens position state. Further, the fifth lens group G5 is a final lens group, and the biconcave lens L51 functions as a first sub group; the biconvex lens L52 and the negative lens L53 having a concave face directed to the image side function as a second sub group; and the biconvex lens L54 functions as a third sub group. The second sub group can be shifted in a direction perpendicular to the optical axis to shift an image.

Numerical values of various dimensions of a numerical value example 2 wherein particular numerical values are applied to the zoom lens of the second embodiment described above are indicated in Table 5 below.

TABLE 5

| Face number | Radius of curvature | Face distance | Refractive index | Abbe number |
|---|---|---|---|---|
| 1: | 6.6860 | 0.158 | 1.94595 | 18.0 |
| 2: | 4.0596 | 0.630 | 1.72916 | 53.3 |
| 3: | −260.7535 | 0.024 | | |
| 4: | 2.8916 | 0.485 | 1.69680 | 55.3 |
| 5: | 8.4763 | (D5) | | |
| 6: | 5.6715 | 0.073 | 1.72916 | 53.3 |
| 7: | 1.0431 | 0.576 | | |
| 8: | −1.6616 | 0.061 | 1.80610 | 40.7 |
| 9: | 7.5744 | 0.079 | | |
| 10: | 2.8955 | 0.236 | 1.92286 | 20.9 |
| 11: | −4.0397 | 0.061 | 1.80610 | 40.7 |
| 12: | 6.3229 | (D12) | | |
| 13: | 0.0000 | 0.402 | Aperture stop | |
| 14: | 2.3009 | 0.485 | 1.77250 | 49.6 |
| 15: | −14.3914 | 0.073 | 1.84666 | 23.8 |
| 16: | 4.6752 | (D16) | | |
| 17: | 2.6134 | 0.418 | 1.48749 | 70.4 |
| 18: | −1.9332 | (D18) | | |

TABLE 5-continued

| Face number | Radius of curvature | Face distance | Refractive index | Abbe number |
|---|---|---|---|---|
| 19: | −18.1985 | 0.085 | 1.77250 | 49.6 |
| 20: | 1.8645 | 0.218 | | |
| 21: | 1.9579 | 0.418 | 1.77250 | 49.6 |
| 22: | −3.7498 | 0.358 | | |
| 23: | −7.9534 | 0.073 | 1.92286 | 20.9 |
| 24: | 3.6724 | 0.183 | | |
| 25: | 7.8989 | 0.218 | 1.77430 | 49.2 |
| 26: | −3.4805 | 0.685 | | |
| 27: | 0.0000 | 0.373 | 1.51680 | 64.2 |
| 28: | 0.0000 | (Bf) | | |

When the lens position state varies from a wide angle end state to a telephoto end state, the face distance D5 between the first lens group G1 and the second lens group G2, the face distance D12 between the second lens group G2 and the aperture stop S, the face distance D16 between the third lens group G3 and the fourth lens group G4 and the face distance D18 between the fourth lens group G4 and the fifth lens group G5 vary. Thus, the values of the face distances in the numerical value example 2 in the wide angle end state, in an intermediate focal length state between the wide angle end and the telephoto end, and in the telephoto end state are indicated in Table 6 below together with those of the focal length f, F number FNO. and angle of view 2ω.

TABLE 6 f 1.00~2.06~4.70
FNO 2.88~3.13~2.91
2ω 61.71~30.36~18.48°

| | f | | |
|---|---|---|---|
| | 1.000 | 2.064 | 4.702 |
| D5 | 0.133 | 0.954 | 1.775 |
| D12 | 1.928 | 1.107 | 0.286 |
| D16 | 0.650 | 0.345 | 0.600 |
| D18 | 0.158 | 0.463 | 0.203 |
| Bf | 0.452 | 0.452 | 0.452 |

The 11th, 16th, 17th and 20th faces in the zoom lens 2 are each formed from an aspheric face, and aspheric coefficients of the aspheric faces in the numerical value example 2 are indicated in Table 7 below.

TABLE 7

| 11th face | $\kappa$ = 0.000000 | A = −0.647937E−02 | B = −0.714148E−03 | C = −0.141539E−02 |
| | | D = 0.117919E−02 | | |
| 16th face | $\kappa$ = 0.000000 | A = −0.611416E−03 | B = 0.193968E−03 | C = −0.197921E−03 |
| | | D = 0.205210E−04 | | |
| 17th face | $\kappa$ = 0.000000 | A = 0.607715E−02 | B = −0.320138E−03 | C = 0.000000E+00 |
| | | D = 0.000000E+00 | | |
| 20th face | $\kappa$ = 0.000000 | A = −0.256667E−02 | B = −0.106773E−02 | C = 0.420468E−03 |
| | | D = −0.526135E−04 | | |

Corresponding values to the conditional expressions of the numerical value example 2 are indicated in Table 8 below:

TABLE 8 f Bt = 8.304
f c = 3.277
f At = −35.227
φ e = 0.155

(1) f t/f Bt = 0.566
(2) f c/f At = 0.697
(3) f t/f At = −0.133
(4) (RA1 − RB0)/(RA1 + RB0) = −0.024
(5) φ e/φ w = 0.155

Figure 9:
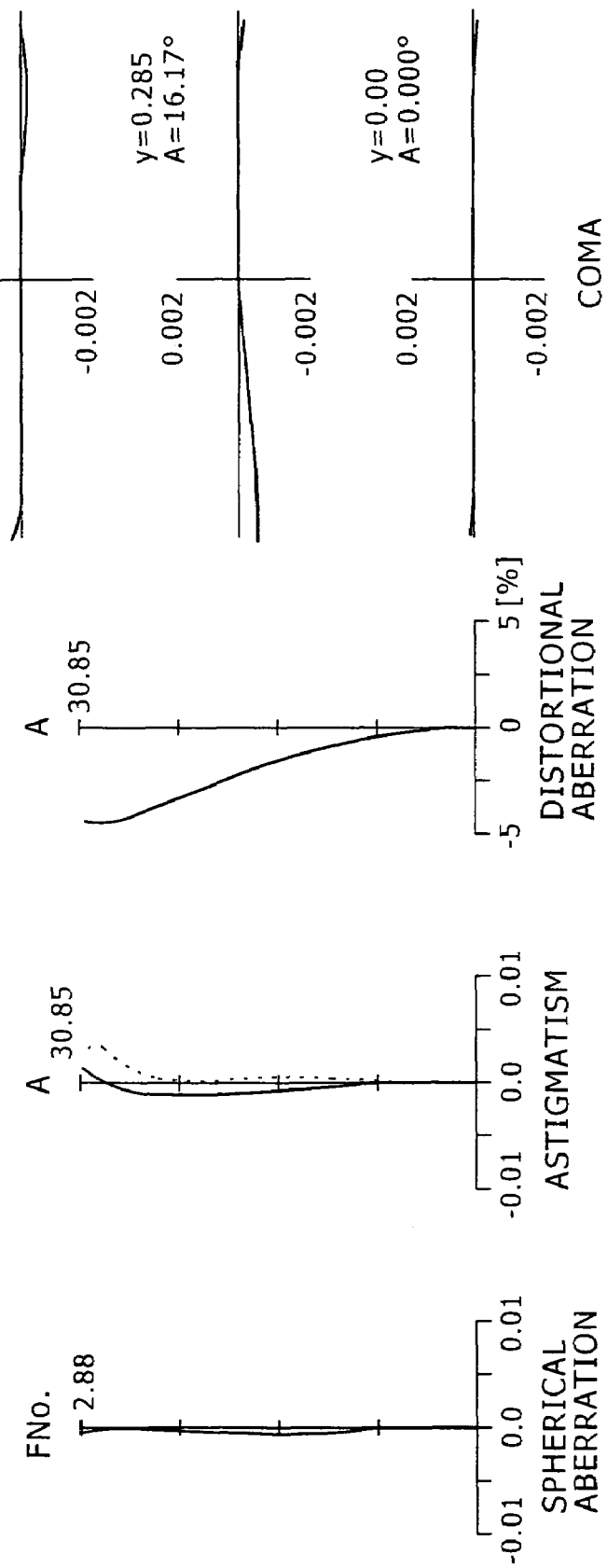
FIG. 9 is a diagrammatic view illustrating spherical aberration, astigmatism, distortional aberration and coma in a wide angle end state of the zoom lens of FIG. 8 according to a numerical value example 2 wherein particular numerical values are applied to the zoom lens.
Figure 10:
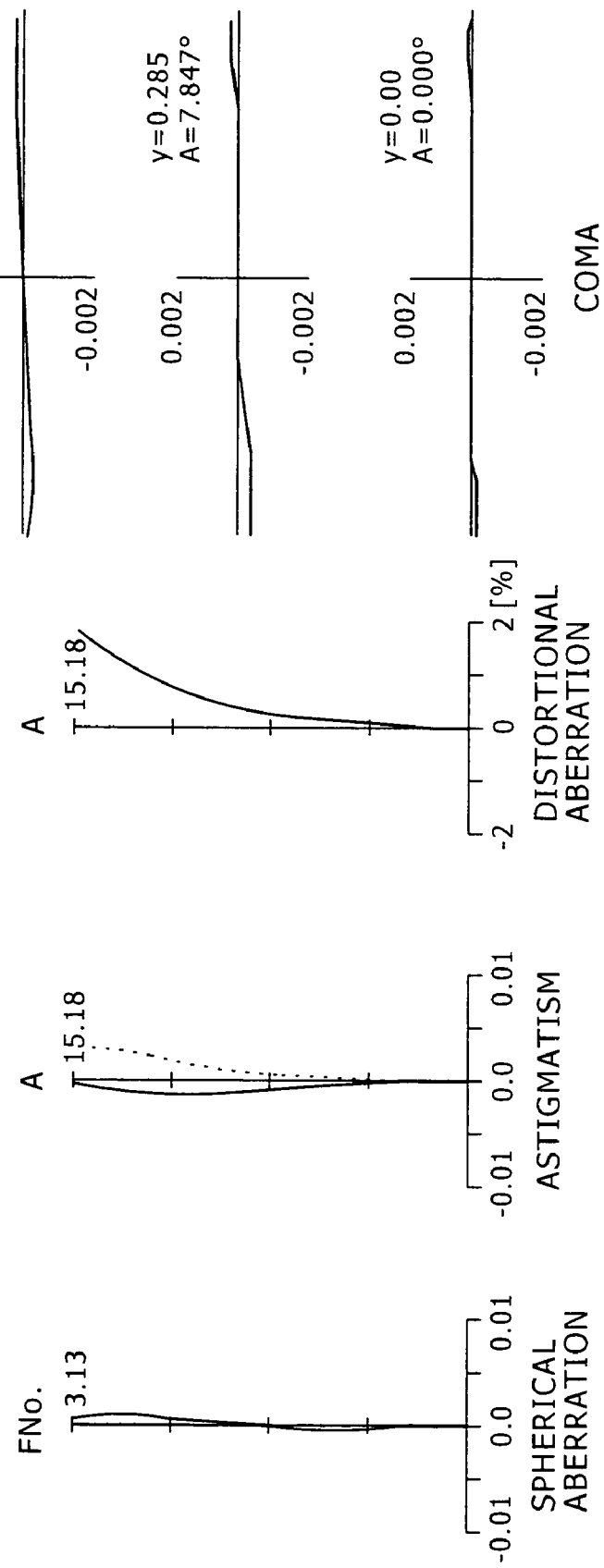
FIG. 10 is a similar view but illustrating spherical aberration, astigmatism, distortional aberration and coma in an intermediate focal length state of the zoom lens of FIG. 8 according to the numerical value example 2.

FIGS. 9 to 11 illustrate various aberrations in a focused state on infinity in the numerical value example 2. Particularly, FIG. 9 illustrates various aberrations in a wide angle end state (f=1.000); FIG. 10 illustrates various aberrations in an intermediate focal length state (f=2.064); and FIG. 11 illustrates various aberrations in a telephoto end state (f=4.702).

In the aberration diagrams of FIGS. 9 to 11, a solid line in a spherical aberration diagram indicates spherical aberration, and a solid line in an astigmatism diagram indicates a sagittal image plane and a broken line indicates a meridional image plane. In a coma diagram, A indicates a half angle of view, and y indicates an image height.

Figure 12:
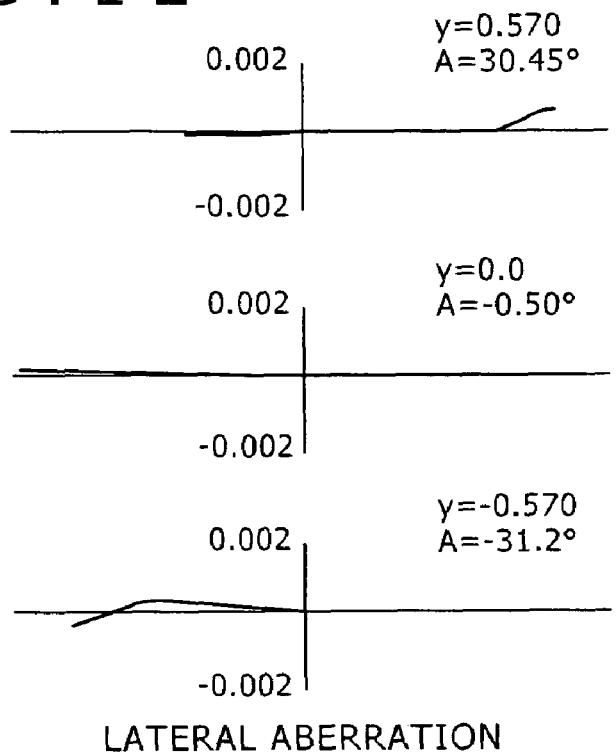
FIG. 12 is a diagrammatic view illustrating lateral aberration in a lens shift state by 0.5 degrees in a wide angle end state of the zoom lens of FIG. 8 according to the numerical value example 2.
Figure 13:
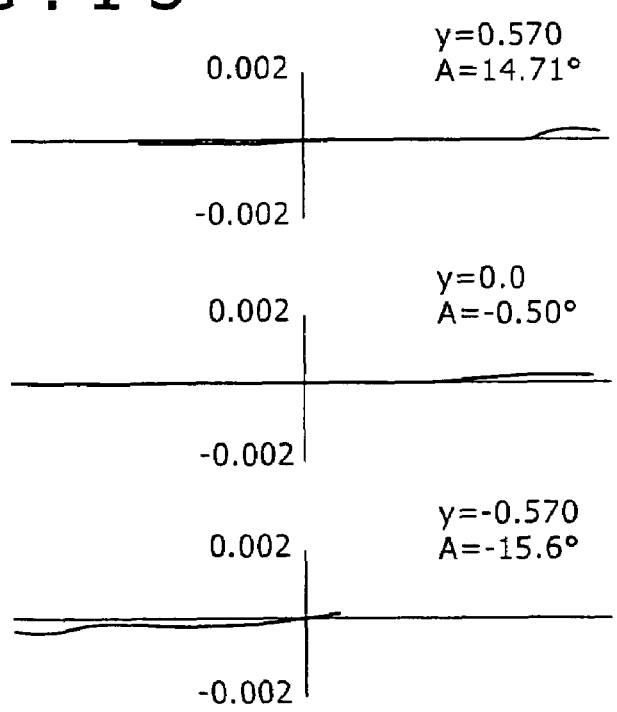
FIG. 13 is a similar view but illustrating lateral aberration in a lens shift state by 0.5 degrees in an intermediate focal length state of the zoom lens of FIG. 8 according to the numerical value example 2.
Figure 14:
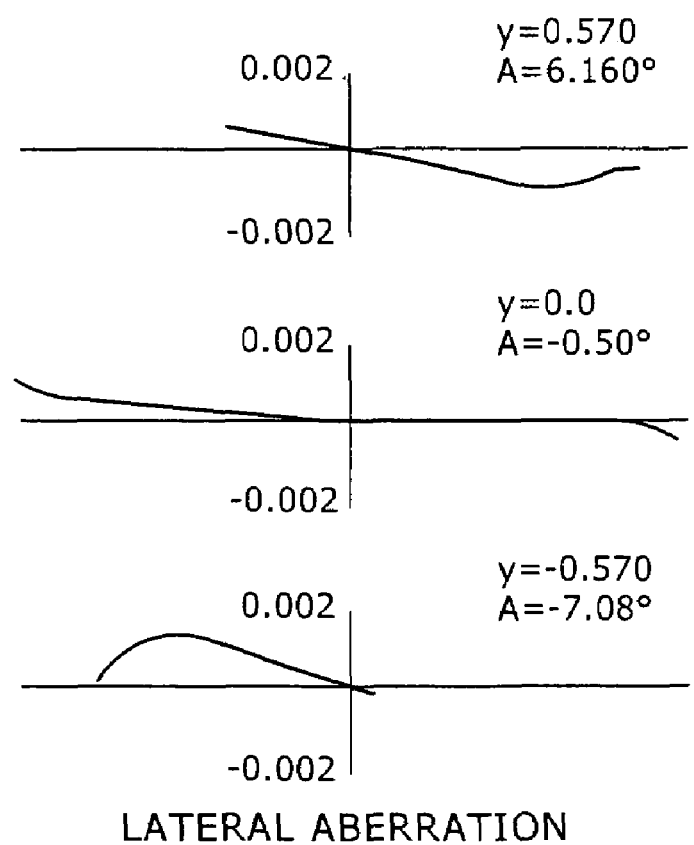
FIG. 14 is a similar view but illustrating lateral aberration in a lens shift state by 0.5 degrees in a telephoto end state of the zoom lens of FIG. 8 according to the numerical value example 2.

FIGS. 12 to 14 illustrate lateral aberration diagrams in a lens shift state corresponding to 0.5 degrees in a focused state on infinity in the numerical value example 2. Particularly, FIG. 12 shows a lateral aberration diagram in a wide angle end state (f=1.000) of the zoom lens; FIG. 13 shows a lateral aberration diagram in an intermediate focal length state (f=2.064); and FIG. 14 shows a lateral aberration diagram in a telephoto end state (f=4.702).

It can be seen apparently from the tables and the aberration diagrams that the numerical value example 2 satisfies the conditional expressions (1) to (5) given hereinabove and indicates favorably corrected aberrations and therefore has a superior image forming property.

Figure 15:
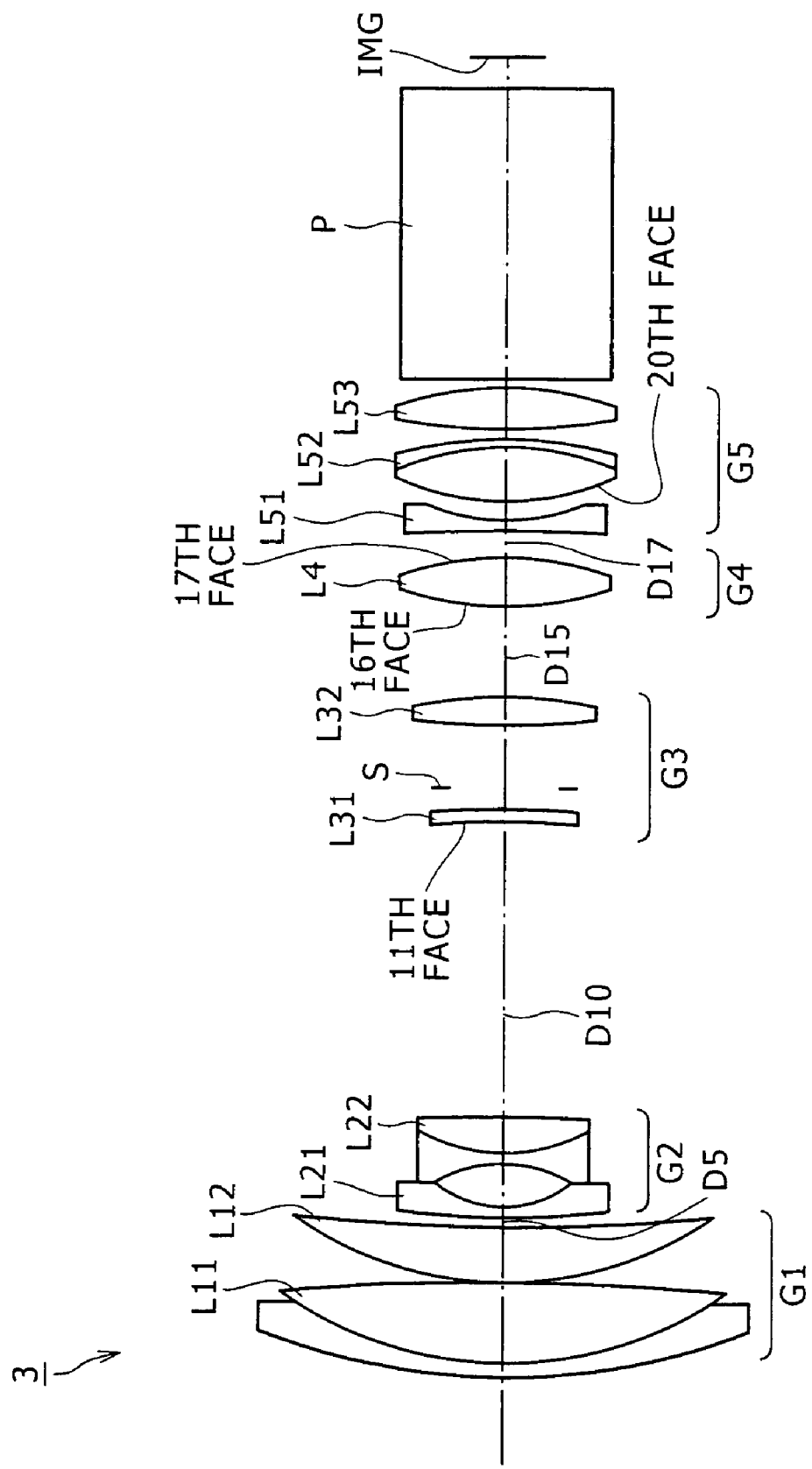
FIG. 15 is a schematic view showing a configuration of a further zoom lens to which the present invention is applied.

FIG. 15 illustrates a lens configuration of the zoom lens according to the third embodiment of the present invention is applied. Referring to FIG. 15, the zoom lens 3 includes a first-lens group G1 having a positive refracting power, a second lens group G2 having a negative refracting power, a third lens group G3 having a positive refracting power, a fourth lens group G4 having a positive refracting power and a fifth lens group G5 having a positive refracting power, disposed in order from the object side. Upon power variation from a wide angle end state to a telephoto end state, the second lens group G2 moves to the image side such that the air distance between the first lens group G1 and the second lens group G2 increases while the air distance between the second lens group G2 and the third lens group G3 decreases. At this time, the first lens group G1, third lens group G3 and fifth lens group G5 are fixed in the direction of the optical axis, and the fourth lens group G4 moves so as to correct the variation of the image plane position caused by the movement of the second lens group G2. Further, upon focusing at a short distance, the fourth lens group G4 moves to the object side. Furthermore, a prism P is disposed between the fifth lens group G5 and an image formation plane IMG.

The first lens group G1 includes a cemented lens L11 of a negative lens of a meniscus shape having a convex face directed to the object side and a positive lens having a convex face directed to the object side, and a positive lens L12 having a convex face directed to the object side. The second lens group G2 includes a negative lens L21 having a concave face directed to the image side, and a cemented lens L22 of a biconcave lens and a biconvex lens. The third lens group G3 includes a negative lens L31 having a concave face formed as an aspheric face directed to the object side and a biconvex lens L32. The fourth lens group G4 includes a biconvex lens L4 having aspheric faces on the opposite sides thereof. The fifth lens group G5 includes a biconcave lens L51, a cemented positive lens L52 of a biconvex lens having an aspheric face on the object side and a negative meniscus lens having a convex face directed to the image side, and a biconvex lens L53.

In the zoom lens 3 of the third embodiment, the first to fourth lens groups G1 to G4 form a power variation section, and an aperture stop S is disposed between the lenses L31 and L32 in the third lens group G3 and is fixed in the direction of the optical axis irrespective of the variation of the lens position state. Further, the fifth lens group G5 is a final lens group, and the biconcave lens L51 functions as a first sub group; the cemented positive lens L52 functions as a second sub group; and the biconvex lens L53 functions as a third sub group. The second sub group can be shifted in a direction perpendicular to the optical axis to shift an image.

Numerical values of various dimensions of a numerical value example 3 wherein particular numerical values are applied to the zoom lens of the third embodiment described above are indicated in Table 9 below.

TABLE 9

| Face number | Radius of curvature | Face distance | Refractive index | Abbe number |
|---|---|---|---|---|
| 1: | 11.3305 | 0.249 | 1.92286 | 20.9 |
| 2: | 6.3631 | 1.238 | 1.48749 | 70.4 |
| 3: | −36.4271 | 0.036 | | |
| 4: | 5.9874 | 0.871 | 1.83500 | 43.0 |
| 5: | 23.2829 | (D5) | | |
| 6: | 13.4700 | 0.142 | 1.88300 | 40.8 |
| 7: | 1.9612 | 0.747 | | |
| 8: | −2.57453 | 0.142 | 1.83500 | 43.0 |
| 9: | 2.4158 | 0.630 | 1.92286 | 20.9 |
| 10: | −15.6769 | (D10) | | |
| 11: | −8.8925 | 0.213 | 1.69350 | 53.3 |
| 12: | −29.7562 | 0.356 | | |
| 13: | 0.0000 | 1.103 | Aperture stop | |
| 14: | 14.2279 | 0.477 | 1.48749 | 70.4 |
| 15: | −6.2892 | (D15) | | |
| 16: | 5.3573 | 0.754 | 1.48749 | 70.4 |
| 17: | −3.8370 | (D17) | | |
| 18: | −14.8367 | 0.213 | 1.88300 | 40.8 |
| 19: | 3.5570 | 0.285 | | |
| 20: | 3.8868 | 0.864 | 1.48749 | 70.4 |
| 21: | −4.4828 | 0.142 | 1.92285 | 20.9 |
| 22: | −6.9242 | 0.178 | | |
| 23: | 9.2160 | 0.694 | 1.62041 | 60.3 |
| 24: | −5.0884 | 0.142 | | |
| 25: | 0.0000 | 4.749 | BAC4_HOYA | |
| 26: | 0.0000 | (Bf) | | |

When the lens position state varies from a wide angle end state to a telephoto end state, the face distance D5 between the first lens group G1 and the second lens group G2, the face distance D10 between the second lens group G2 and the third lens group G3, the face distance D15 between the third lens group G3 and the fourth lens group G4 and the face distance D17 between the fourth lens group, G4 and the fifth lens group G5 vary. Thus, the values of the face distances in the numerical. value example 3 in the wide angle end state, in an intermediate focal length state between the wide angle end and the telephoto end, and in the telephoto end state are indicated in Table 10 below together with those of the focal length f, F number FNO. and angle of view 2ω.

TABLE 10 f  1.00~2.06~9.20
FNO  1.85~2.25~2.47
2ω  63.29~24.10~6.83°

| | f | | |
|---|---|---|---|
| | 1.000 | 2.600 | 9.200 |
| D5 | 0.178 | 2.459 | 4.440 |
| D10 | 4.849 | 2.568 | 0.587 |
| D15 | 1.539 | 0.893 | 1.266 |
| D17 | 0.427 | 1.073 | 0.700 |
| Bf | 0.508 | 0.508 | 0.508 |

The 11th, 16th, 17th and 20th faces in the zoom lens 3 are each formed from an aspheric face, and aspheric coefficients of the aspheric faces in the numerical value example 3 are indicated in Table 11 below.

TABLE 11

| 11th face | κ = 0.000000 | A = −0.647937E−02 | B = −0.714148E−03 | C = −0.141539E−02 | D = 0.117919E−02 |
| 16th face | κ = 0.000000 | A = −0.611416E−03 | B = 0.193968E−03 | C = −0.197921E−03 | D = 0.205210E−04 |
| 17th face | κ = 0.000000 | A = 0.607715E−02 | B = −0.320138E−03 | C = 0.000000E+00 | D = 0.000000E+00 |
| 20th face | κ = 0.000000 | A = −0.256667E−02 | B = −0.106773E−02 | C = 0.420468E−03 | D = −0.526135E−04 |

Corresponding values to the conditional expressions of the numerical value example 3 are indicated in Table 12 below:

TABLE 12 f Bt = 31.931
fc = 5.384
f At = −25.404
φ e = 0.111

(1) ft/fBt = 0.288
(2) fc/ft = 0.585
(3) ft/fAt = −0.362
(4) (RA1 − RB0)/(RA1 + RB0) = −0.044
(5) φe/φw = 0.111

Figure 17:
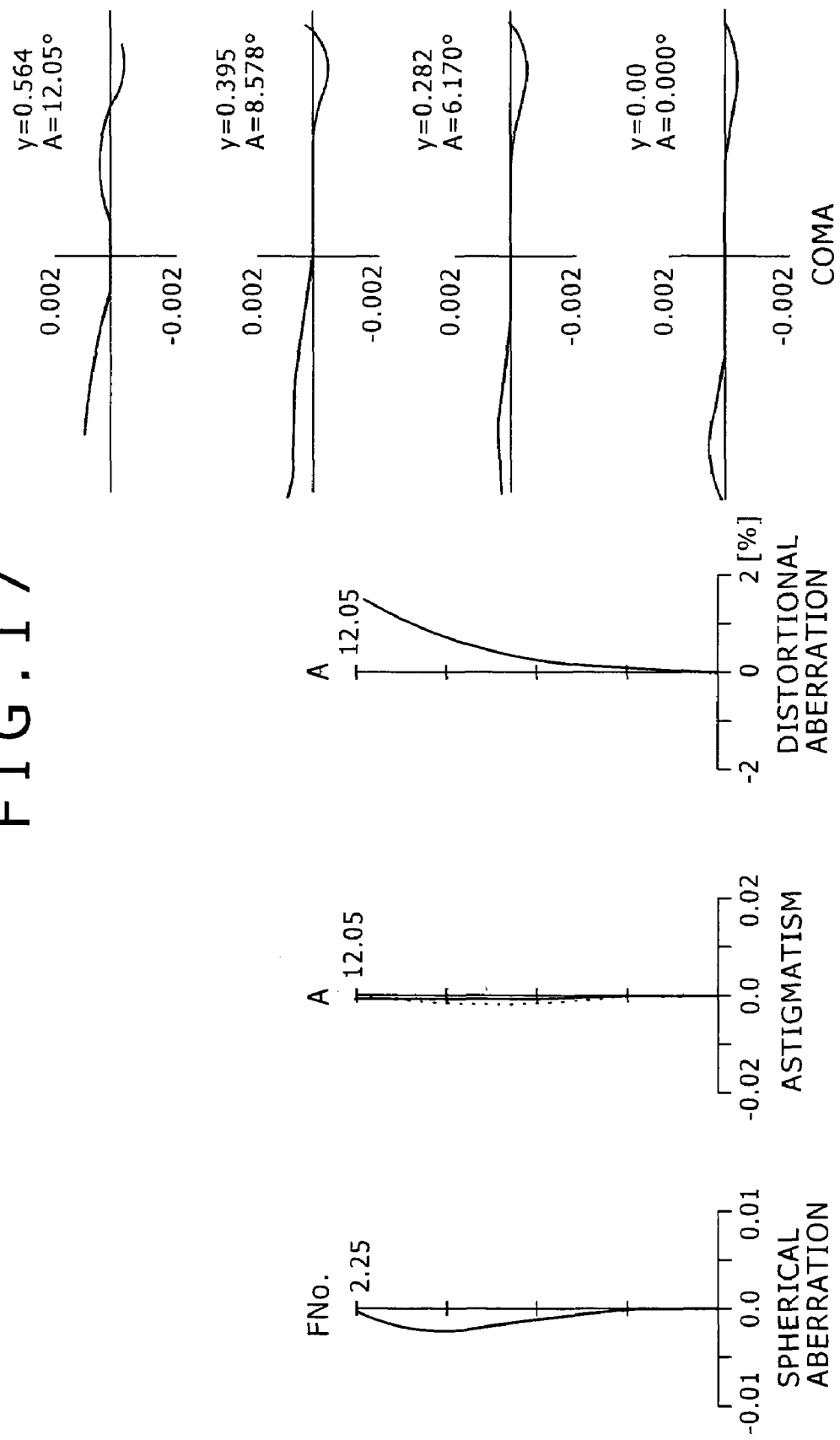
FIG. 17 is a similar view but illustrating spherical aberration, astigmatism, distortional aberration and coma in an intermediate focal length state of the zoom lens of FIG. 15 according to the numerical value example 3.
Figure 18:
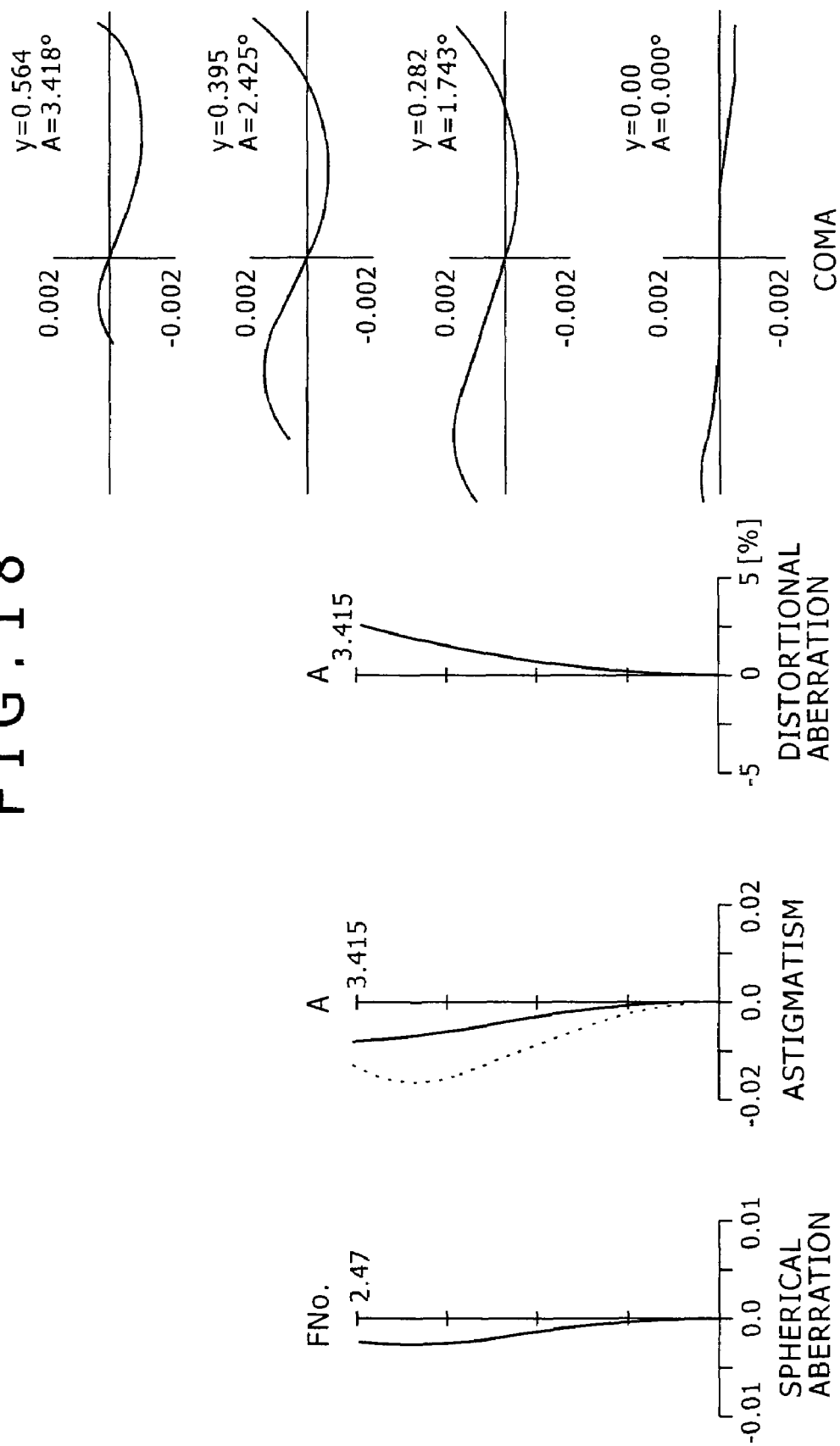
FIG. 18 is a similar view but illustrating spherical aberration, astigmatism, distortional aberration and coma in a telephoto end state of the zoom lens of FIG. 15 according to the numerical value example 3.

FIGS. 16 to 18 illustrate various aberrations in a focused state on infinity in the numerical value example 3. Particularly, FIG. 16 illustrates various aberrations in a wide angle end state (f=1.000); FIG. 17 illustrates various aberrations in an intermediate focal length state (f=2.600); and FIG. 18 illustrates various aberrations in a telephoto end state (f=9.200).

In the aberration diagrams of FIGS. 16 to 18, a solid line in a spherical aberration diagram indicates spherical aberration, and a solid line in an astigmatism diagram indicates a sagittal image plane and a broken line indicates a meridional image plane. In a coma diagram, A indicates a half angle of view, and y indicates an image height.

Figure 19:
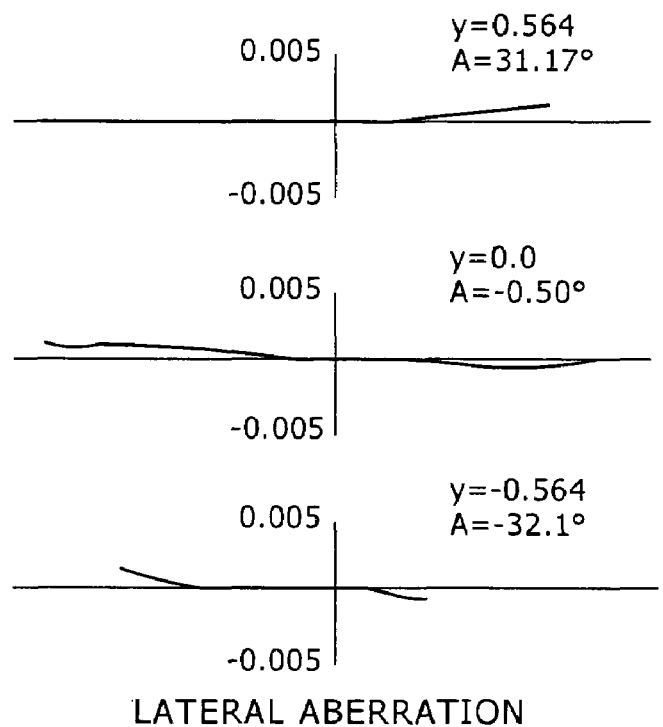
FIG. 19 is a diagrammatic view illustrating lateral aberration in a lens shift state by 0.5 degrees in a wide angle end state of the zoom lens of FIG. 15 according to the numerical value example 3.
Figure 20:
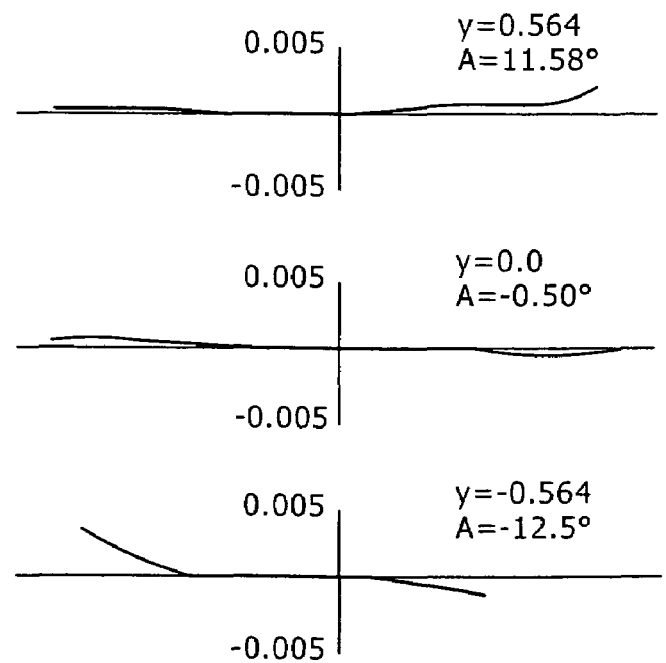
FIG. 20 is a similar view but illustrating lateral aberration in a lens shift state by 0.5 degrees in an intermediate focal length state of the zoom lens of FIG. 15 according to the numerical value example 3.
Figure 21:
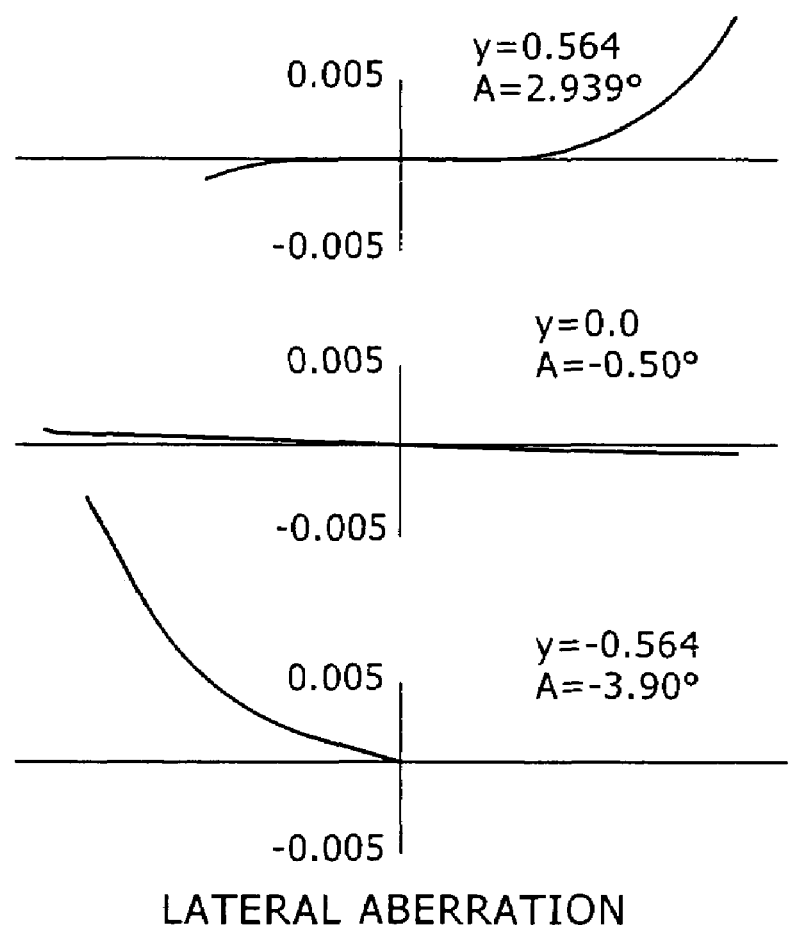
FIG. 21 is a similar view but illustrating lateral aberration in a lens shift state by 0.5 degrees in a telephoto end state of the zoom lens of FIG. 15 according to the numerical value example 3.

FIGS. 19 to 21 illustrate lateral aberration diagrams in a lens shift state corresponding to 0.5 degrees in a focused state on infinity in the numerical value example 3. Particularly, FIG. 19 shows a lateral aberration diagram in a wide angle end state (f=1.000) of the zoom lens; FIG. 20 shows a lateral aberration diagram in an intermediate focal length state (f=2.600); and FIG. 21 shows a lateral aberration diagram in a telephoto end state (f=9.200)

It can be seen apparently from the tables and the aberration diagrams that the numerical value example 3 satisfies the conditional expressions (1) to (5) given hereinabove and indicates favorably corrected aberrations and therefore has a superior image forming property.

Figure 22:
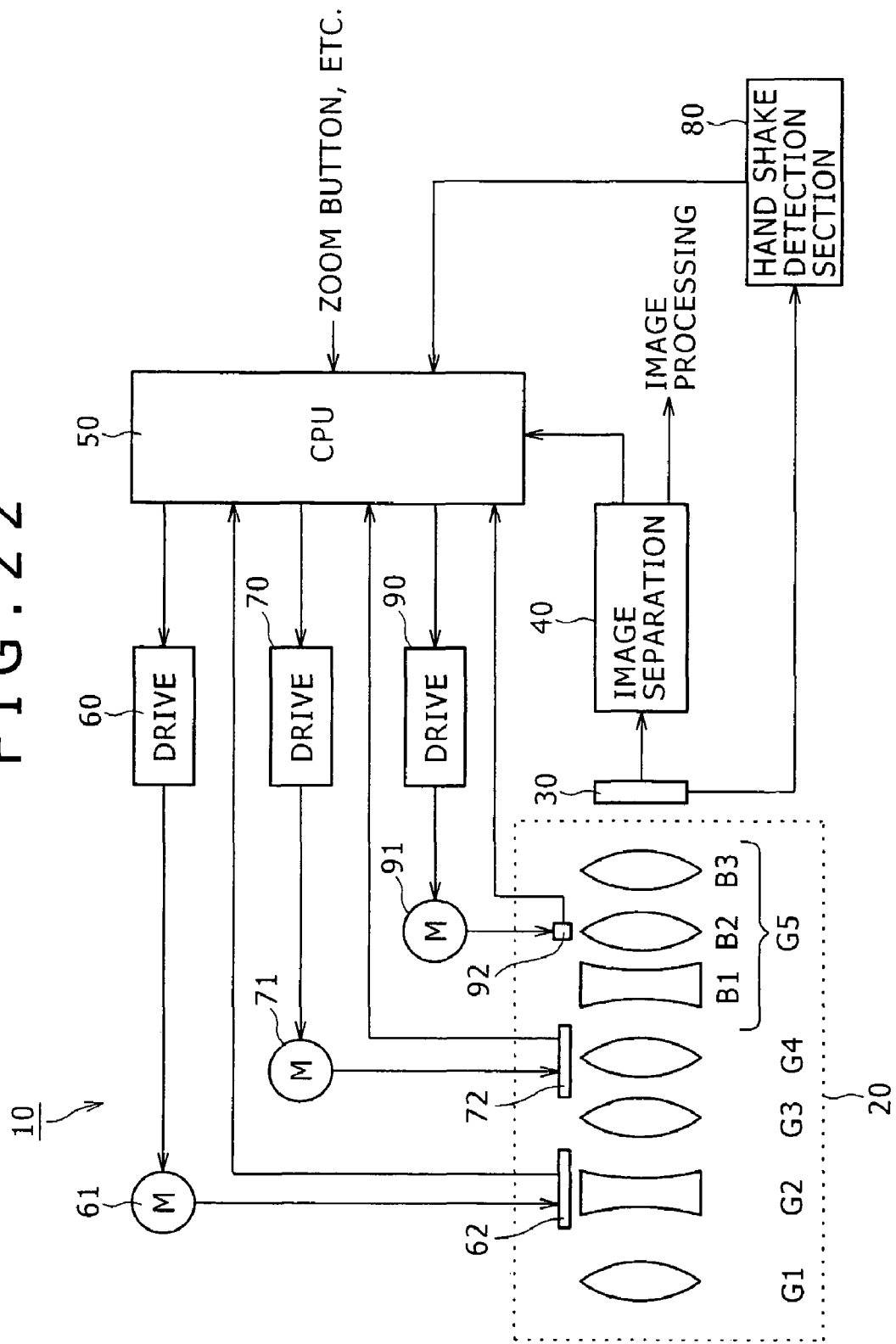
FIG. 22 is a block diagram showing an image pickup apparatus to which the present invention is applied.

FIG. 22 shows an image pickup apparatus to which the present invention is applied.

Referring to FIG. 22, the image pickup apparatus shown is denoted by 10 and includes a zoom lens 20 and an image pickup device 30 for converting an optical image formed by the zoom lens 20 into an electric signal. It is to be noted that the image pickup device 30 may be formed from photoelectric conversion elements such as CCDs (Charge Coupled Devices) or CMOS (Complementary Metal-Oxide Semiconductor) devices. Meanwhile, the zoom lens 20 may be formed from the zoom lens according to the present invention. In FIG. 22, each of the lens groups of the zoom lens 1 according to the first embodiment described hereinabove is shown in a simplified form of a single lens. Naturally, not only the zoom lens 1 according to the first embodiment but also any of the zoom lenses 2 and 3 according to the second and third embodiments and zoom lenses according to the present invention which are configured in different forms than the embodiments disclosed in the present application can be used for the zoom lens 20.

An electric signal formed by the image pickup device 30 is supplied to an image separation circuit 40. Thus, a signal for focusing control is sent from the image separation circuit 40 to a control circuit 50, and an image signal is sent from the image separation circuit 40 to an image processing circuit. The signal sent to the image processing circuit is worked into a signal of a form suitable for later processing so that it is thereafter subject to various processes such as display by a display apparatus, recording on a recording medium, transfer by a communication section and so forth.

The control circuit 50 receives various operation signals from the outside such as an operation signal representative of an operation of a zoom button and performs various processes in response to the received operation signals. For example, if a zooming instruction from the zoom button is inputted to the control circuit 50, then the control circuit 50 controls driver circuits 60 and 70 to operate driving sections 61 and 71 to move the second and fourth lens groups G2 and G4 to prospective predetermined positions in order to establish a focal distance state based on the instruction. Position information of the second and fourth lens groups G2 and G4 then obtained from sensors 62 and 72 is inputted to the control circuit 50 and referred to by the control circuit 50 when the control circuit 50 is to output instruction signals to the driver circuits 60 and 70. Further, the control circuit 50 checks the focusing state based on a signal received from the image separation circuit 40 and controls the driver circuit 70 to operate the driving section 71 to control the position of the fourth lens group G4 so that an optimum focused state may be obtained.

The image pickup apparatus 10 has a hand shake correction function. For example, if a shake of the image pickup device 30 caused, for example, by depression of the shutter release button, is detected by a hand shake detection section 80 which may be, for example, a gyro sensor, then a signal from the hand shake detection section 80 is inputted to the control circuit 50. Consequently, the control circuit 50 calculates a blur correction angle for correcting the blur of the image by the shake of the image pickup device 30. In order to position the second sub group B2 of the fifth lens group G5 so as to be based on the calculated blur correction angle, the control circuit 50 controls a driver circuit 90 to operate a driving section 91 to shift the second sub group B2 in a direction perpendicular to the optical axis. The position of the second sub group B2 of the fifth lens group G5 is detected by a sensor 92, and position information of the second sub group B2 obtained by the sensor 92 is inputted to the control circuit 50 and referred to by the control circuit 50 when the control circuit 50 tries to signal an instruction signal to the driver circuit 90.

The image pickup apparatus 10 described above can assume various forms as a particular product. For example, the image pickup apparatus 10 can be applied widely as digital still cameras, digital video cameras and camera sections and so forth of digital inputting/outputting apparatus such as portable telephone sets in which a camera is incorporated or PDAs (Personal Digital Assistants) in which a camera is incorporated.

While preferred embodiments of the present invention have been described using specific terms, such description is for illustrative purposes only, and it is to be understood that changes and variations may be made without departing from the spirit or scope of the following claims.

What is claimed is:

1. A zoom lens, comprising:
a power variation section and a final lens group disposed in order from an object side;
said power variation section including at least two movable lens groups which are movable in a direction of an optical axis thereof to vary a lens position state from a wide angle end state to a telephoto end state;
said final lens group being fixed in the direction of the optical axis independently of the lens position state, said final lens group including three sub groups which include a first sub group having a negative refracting power, a second sub group having a positive refracting power and a third sub group having a positive refracting power, disposed in order from the object side;
said second sub group being shiftable in a direction substantially perpendicular to the optical axis to shift an image;
a conditional expression (1)

$$0.2 < ft/fBt < 0.8 \quad (1)$$

being satisfied where ft is the focal distance of the entire lens system in the telephoto end state and fBt is the focal distance of entire lens groups disposed on the object side with respect to said third sub group in the telephoto end state.

2. The zoom lens according to claim 1, wherein a conditional expression (2)

$$0.4 < fc/ft < 0.9 \quad (2)$$

is satisfied where fc is the focal distance of said third sub group.

3. The zoom lens according to claim 1, wherein a conditional expression (3)

$$-0.5 < ft/fAt < -0.1 \quad (3)$$

is satisfied where ft is the focal distance of the entire lens system in the telephoto end state and fAt is the focal distance of entire lens groups disposed on the object side with respect to said second sub group in the telephoto end state.

4. The zoom lens according to claim 1, wherein that one of lens faces of said second sub group which is disposed nearest to the object side is a convex face, and a conditional expression (4)

$$-0.1 < (RAI-RB0)/(RAI+RB0) < 0 \quad (4)$$

is satisfied where RAI is the radius of curvature of that one of lens faces of said first sub group which is disposed nearest to the image side and RB0 is the radius of curvature of that one of lens faces of said second sub group which is disposed nearest to the object side.

5. The zoom lens according to claim 1, wherein a conditional expression (5)

$$0.05 < \phi e/\phi w < 0.2 \quad (5)$$

is satisfied where $\phi e$ is the refracting power of said final lens group which is a reciprocal number to the focal distance and $\phi w$ is the refracting power of the entire lens system in the wide angle state which is a reciprocal number to the focal distance.

6. The zoom lens according to claim 1, wherein said power variation section comprises a first lens group having a positive refracting power, a second lens group having a negative refracting power and a third lens group having a positive refracting power, disposed in order from the object side, and when the lens position state varies from the wide angle end state to the telephoto end state, the distance between said first lens group and said second lens group increases while the distance between said second lens group and said third lens group decreases, said zoom lens further comprising an aperture stop disposed in the proximity of said third lens group.

7. The zoom lens according to claim 6, wherein said power variation section further comprises a fourth lens group disposed on the image side with respect to said third lens group and having a positive refracting power, said fourth lens group being movable upon variation of the lens position state and upon focusing at a short distance.

8. An image pickup apparatus, comprising:
a zoom lens; and
an image pickup element for converting an optical image formed by said zoom lens into an electric signal;
said zoom lens including a power variation section and a final lens group disposed in order from an object side, said power variation section including at least two movable lens groups which are movable in a direction of an optical axis thereof to vary a lens position state from a wide angle end state to a telephoto end state, said final lens group being fixed in the direction of the optical axis independently of the lens position state, said final lens group including three sub groups which include a first sub group having a negative refracting power, a second sub group having a positive refracting power and a third sub group having a positive refracting power, disposed in order from the object side, said second sub group being shiftable in a direction substantially perpendicular to the optical axis to shift an image, a conditional expression (1)

$$0.2 < ft/fBt < 0.8 \quad (1)$$

being satisfied where ft is the focal distance of the entire lens system in the telephoto end state and fBt is the focal distance of entire lens groups disposed on the object side with respect to said third sub group in the telephoto end state.

9. The image pickup apparatus according to claim 8, wherein said power variation section includes a first lens group having a positive refracting power, a second lens group having a negative refracting power and a third lens group having a positive refracting power, disposed in order from the object side, and when the lens position state varies from the wide angle end state to the telephoto end state, the distance between said first lens group and said second lens group increases while the distance between said second lens group and said third lens group decreases, said zoom lens further including an aperture stop disposed in the proximity of said third lens group.

10. The image pickup apparatus according to claim 8, further comprising:
- a hand shake detection section for detecting a shake of said image pickup element;
- a hand shake control section for calculating a blur correction angle for correcting an image blur by the shake of said image pickup element detected by said hand shake detection section and signaling a driving signal for positioning said second sub group at a position based on the blur correction angle; and
- a hand shake driving section for receiving the driving signal signaled from said hand shake control section and shifting said second sub group in a direction perpendicular to the optical axis based on the received driving signal.

* * * * *